(12) United States Patent
Shiraishi et al.

(10) Patent No.: US 6,392,869 B2
(45) Date of Patent: May 21, 2002

(54) SOLID ELECTROLYTIC CAPACITOR

(75) Inventors: Seigo Shiraishi, Osaka; Emiko Igaki, Hyogo; Masakazu Tanahashi, Osaka; Mikinari Shimada, Kyoto; Norihisa Takahara, Osaka; Yasuhiko Nakada, Osaka; Keizou Nakagawa, Osaka; Hideki Masumi, Kyoto; Eiji Yamashita, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/864,661

(22) Filed: May 23, 2001

(30) Foreign Application Priority Data

May 26, 2000 (JP) .................................. 2000-156789
Feb. 13, 2001 (JP) .................................. 2001-035514

(51) Int. Cl.$^7$ ................................................ H01G 9/00
(52) U.S. Cl. ....................... 361/523; 361/528; 361/532; 361/541
(58) Field of Search ................................ 361/523, 528, 361/529, 531, 532, 541

(56) References Cited

U.S. PATENT DOCUMENTS 5,377,073 A * 12/1994 Fukaumi et al. ........... 29/25.03
6,249,424 B1 * 6/2001 Nitoh et al. ................. 361/523

FOREIGN PATENT DOCUMENTS

| JP | 6-84716 | 3/1994 |
| JP | 6-132178 | 5/1994 |
| JP | 8-273983 | 10/1996 |

* cited by examiner

Primary Examiner—Anthony Dinkins
(74) Attorney, Agent, or Firm—Merchant & Gould PC

(57) ABSTRACT

A solid electrolytic capacitor capable of realizing miniaturization and large capacitance and obtaining the connection, in particular electric connection between the anodes, with low resistance and high reliability. A solid electrolytic capacitor includes: a laminate including a plurality of capacitor units in which a dielectric layer and a solid electrolytic layer are laminated in this order on a predetermined surface of an anode made of a valve metal; a sealing body for sealing the laminate; and an anodic conductive elastic body formed outside the sealing body and electrically connected to the anode. The anodes are adhered to each other via the conductive elastic body. In the solid electrolytic capacitor, a part of the anode is exposed to the outside of the sealing portion and the exposed portion is covered with a plating layer, and electrically connected to the anodic conductive elastic body via the covered exposed portion.

61 Claims, 13 Drawing Sheets

SOLID ELECTROLYTIC CAPACITOR

BACKGROUND OF THE INVENTION

1. Field of the Invention

The present invention relates to a solid electrolytic capacitor.

2. Description of the Prior Art

A solid electrolytic capacitor has a structure in which an anode is formed of a valve metal such as aluminum, tantalum, niobium, or the like; an oxide film as a dielectric layer is formed by anodizing the anode; and a solid electrolytic layer and a cathode layer are laminated on the dielectric layer in this order.

In recent years, with the demand for digitalization of a circuit and miniaturization of electronic equipment, there is an increasing demand for high-frequency response characteristics and miniaturization of electronic components. Also in a solid electrolytic capacitor, in order to meet such demands, low resistance of a conductor part such as a solid electrolytic layer, a cathode layer, and the like and miniaturization and large capacitance of a solid electrolytic capacitor is promoted.

For realizing miniaturization and large capacitance of a solid electrolytic capacitor, a laminated type solid electrolytic capacitor in which a plurality of capacitor units are laminated is proposed. FIG. 13A is a perspective view of a conventional solid electrolytic capacitor, and FIG. 13B is a cross-sectional view taken along line I—I in FIG. 13A. In general, the electrolytic capacitor is produced as follows. First, a capacitor unit is formed by forming a dielectric layer 2, a solid electrolytic layer 3 and a cathode layer 4 in this order on the predetermined surface of an anode layer 1. Then, a plurality of capacitor units are laminated via a conductive adhesive 5 to form a unit laminate. Next, the anode lead portions 1a that are not covered with a solid electrolytic layer and the like are bundled and integrated into an anodic extraction terminal 13 by welding. Furthermore, a cathodic extraction terminal 9 is connected to a cathode layer 4 of the capacitor unit constituting the bottom layer of the laminate via a conductive adhesive 7. Finally, a sealing body 8 is formed in a state in which the anodic extraction terminal 13 and the cathodic extraction terminal 9 are exposed to the outside.

In a solid electrolytic capacitor, further miniaturization and large capacitance are demanded. At the same time, in order to improve the high-frequency response characteristics of the products, the connection between conductors, in particular the connection between a valve metal as an anode and an anodic terminal, has further been demanded to have low resistance property and improved reliability.

JP 6 (1994)-84716 A discloses a method in which an anode of each capacitor unit is exposed to the outside of the sealing body respectively; a conductive layer formed of a thermal spraying layer, a sputtering film, a conductive resin, or the like is formed so as to cover the exposed portion; and anodes are electrically integrated via the conductive layer. According to this method, since the space necessary to integrate the anodes becomes smaller as compared with the capacitor shown in FIGS. 13A and 13B, it is possible to achieve further miniaturization and large capacitance. However, since an interface resistance between the anode and the conductive layer due to a natural oxide film formed on the surface of the valve metal is large, there are disadvantages in that connection with low resistance and high reliability cannot be obtained.

Furthermore, JP 8 (1996)-273983 A describes a method of forming a metal plating layer on the surface of each anode layer and connecting this respective metal plating layer to a further plating layer; and a method of connecting the individual metal plating layers to each other by soldering or welding. However, in the former method in which the anodes are connected to each other only by a plating layer, there is a problem in the reliability of the mechanical strength, etc. Furthermore, in a latter method in which a plating layer is connected by welding and the like, a thermal effect due to high temperature heating in welding is not negligible, thus deteriorating the quality of products. In addition, since the plating layer is generally thin, there is an industrial difficulty in connecting the extremely thin plating layers to each other by welding, that is, by fusing of metals.

SUMMARY OF THE INVENTION

Therefore, with the foregoing in mind, it is an object of the present invention to provide a solid electrolytic capacitor realizing miniaturization and large capacitance and capable of obtaining a low resistance and high reliability when electrically connecting anodes to each other.

In order to achieve the above-mentioned object, the first solid electrolytic capacitor of the present invention includes a laminate comprising a plurality of capacitor units, each capacitor unit comprising an anode made of a valve metal, a dielectric layer formed on the anode and a solid electrolytic layer formed on the dielectric layer; a sealing body for sealing the laminate; and an anodic conductive elastic body formed outside the sealing body and electrically connected to the anode; the anodes being electrically connected to each other via the anodic conductive elastic body; wherein a part of the anode is exposed to the outside of the sealing body, and the exposed portion of the anode is covered with a plating layer and electrically connected to the anodic conductive elastic body via the plating layer.

With such a configuration, since the space necessary for electric integration of the anodes can be reduced, it is possible to realize miniaturization and large capacitance of a solid electrolytic capacitor. Furthermore, since a plating layer is interposed between the anode and the anodic conductive elastic body, it is possible to suppress the increase of the interface resistance between the anode and the conductive elastic body due to a natural oxide film formed on the surface of the valve metal, and thus to realize the connection with low resistance and high reliability.

It is preferable that the first solid electrolytic capacitor further includes a cathode layer being laminated on the solid electrolytic layer.

Furthermore, the second solid electrolytic capacitor of the present invention includes a laminate comprising a plurality of capacitor units, each capacitor unit comprising an anode made of a valve metal, a dielectric layer formed on the anode, a solid electrolytic layer formed on the dielectric layer and a cathode layer formed on the solid electrolytic layer; a sealing body for sealing the laminate; and an anodic conductive elastic body formed outside the sealing body and electrically connected to the anode; the anodes being electrically connected to each other via the anodic conductive elastic body; wherein a part of the anode is exposed to the outside of the sealing body, and the exposed portion of the anode is covered with a plating layer and electrically connected to the anodic conductive elastic body via the plating layer.

With such a configuration, since the space necessary for electric integration of the anodes can be reduced, it is possible to achieve miniaturization and large capacitance of a solid electrolytic capacitor. Furthermore, since a plating layer is interposed between the anode and the anodic conductive elastic body, it is possible to suppress the increase of the interface resistance between the anode and the conductive elastic body due to a natural oxide film formed on the surface of the valve metal, and thus to realize the connection with low resistance and high reliability.

Furthermore, in the first and second solid electrolytic capacitors, it is preferable that the plating layer has a multi-layer structure. For example, by constituting the plating layer by a plurality of plating layers having a various kinds of materials, it is possible to compensate for respective defects in the properties of each plating material.

Furthermore, in the solid electrolytic capacitor, the plating layer includes at least one selected from the group consisting of a nickel plating layer, a copper plating layer, a zinc plating layer, a silver plating layer, a tin plating layer, a gold plating layer and a solder plating layer. Nickel plating herein is defined as a plating including nickel as a main component. This definition applies to the other kinds of metal plating. The main component herein denotes a component with the largest content (wt. %) in the plating.

Furthermore, in the first and second solid electrolytic capacitors, it is preferable that the anodic conductive elastic body is formed of a resin comprising conductive powder.

Furthermore, in the first and second solid electrolytic capacitors, it is preferable that the conductive powder is at least one selected from the group consisting of silver powder, copper powder, and carbon powder. This is preferable because the conductive powder has high conductivity, and thus resistance can be lowered further.

Furthermore, it is preferable that the first and second solid electrolytic capacitors further include a metal electrode formed outside the sealing body and electrically connected to the anodic conductive elastic body. This is preferable because resistance can be lowered further.

Furthermore, in the first and second solid electrolytic capacitors, as the metal electrode, a metal plate or metal cap can be used. In this case, a part in which the metal plate or metal cap is in contact with the anodic conductive elastic body is plated. As the plating layer, for example, silver plating layer and gold plating layer are preferred for realizing the low resistance property. Furthermore, it is preferable that the above-mentioned plating layer has a multi-layer structure. For example, by constituting the plating layer of a plurality of plating layers having various kinds of materials, it is possible to compensate for respective defects in properties of each plating material. Furthermore, as the metal electrode, a metal layer formed by plating can be used.

Furthermore, in the first and second solid electrolytic capacitors, it is preferable that the capacitor units are laminated to each other via a conductive adhesive and the solid electrolytic layers are electrically connected to each other via this conductive adhesive.

Furthermore, it is preferable that the first and second solid electrolytic capacitors further comprising a cathodic terminal electrically connected to the solid electrolytic layer and the cathodic terminal are adjacent to all the capacitor units constituting the laminate and directly connected to all the capacitor units via a conductive adhesive. This is preferable because it is possible to extract capacitance from each capacitor unit with low resistance easily and to obtain a capacitor with excellent high-frequency response characteristics.

In this case, as the cathodic terminal, a lead frame can be used and a part of the lead frame is exposed to the outside of the sealing body.

Furthermore, as the cathodic terminal, a metal chip can be used and a part of the metal chip is exposed to the outside of the sealing body. It is preferable that as the metal chip, a metal including at least one of silver and gold is used.

Furthermore, in the first and second solid electrolytic capacitors, it is preferable that a part of the metal chip exposed to the outside of the sealing body is covered with a cathodic conductive elastic body. Furthermore, it is preferable that the first and second solid electrolytic capacitors include a metal electrode that is electrically connected to the cathodic conductive elastic body.

Furthermore, in the first and second solid electrolytic capacitors, it is preferable that the capacitor units are laminated to each other via a metal foil and the solid electrolytic layers are electrically connected to each other via this metal foil.

In this case, it is preferable that the metal foil is formed of the valve metal. Furthermore, it is preferable that the first and second solid electrolytic capacitors further include a cathodic conductive elastic body formed outside the sealing body and electrically connected to the metal foil, wherein a part of the metal foil is exposed to the outside of the sealing body and the exposed portion is covered with the plating layer and electrically connected to the cathodic conductive elastic body via the plating layer. Furthermore, it is preferable that the metal electrode formed outside the sealing body and electrically connected to the cathodic conductive elastic layer is included.

As the cathodic conductive elastic body, a resin including conductive powder is preferably used. Furthermore, it is preferable that the conductive powder is at least one selected from the group consisting of silver powder, copper powder, and carbon powder.

As the metal electrode, it is possible to use a metal plate or metal cap. In this case, a part in which the metal plate or metal cap is in contact with the cathodic conductive elastic body is plated. As the plating layer, for example, a silver plating layer and gold plating layer are preferred for realizing the low resistance property. Furthermore, it is preferable that the above-mentioned plating layer has a multi-layer structure. For example, by constituting the plating layer of a plurality of plating layers having various kinds of materials, it is possible to compensate for respective defects in properties of each plating material. Furthermore, as the metal electrode, a metal layer formed by plating can be used.

DESCRIPTION OF THE PREFERRED EMBODIMENTS

Hereinafter, the present invention will be described by way of embodiments with reference to the accompanying drawings.

(Embodiment 1)

Figure 1A:
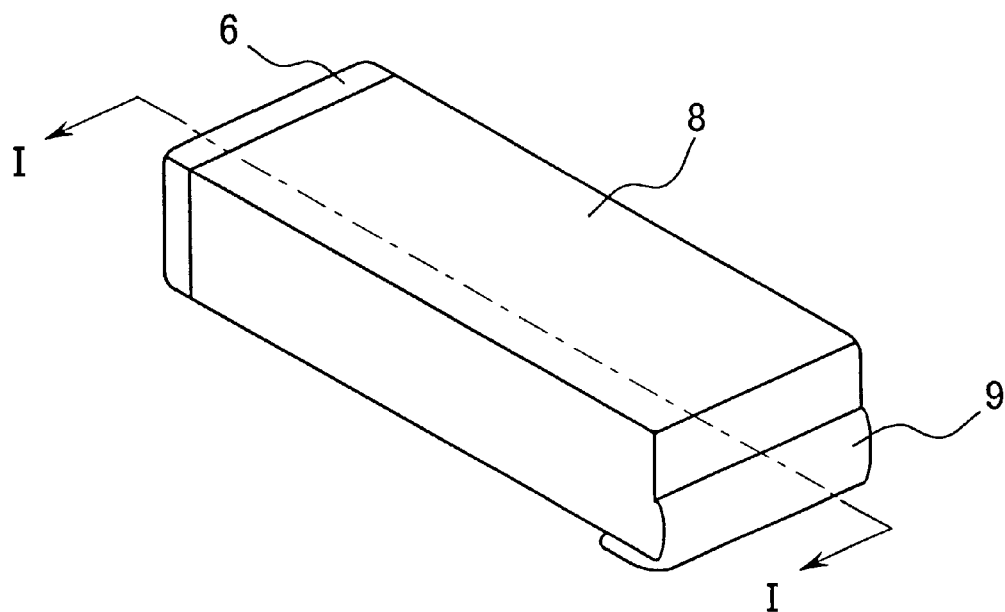
FIG. 1A is a perspective view of an example of a solid electrolytic capacitor according to a first embodiment.
Figure 1B:
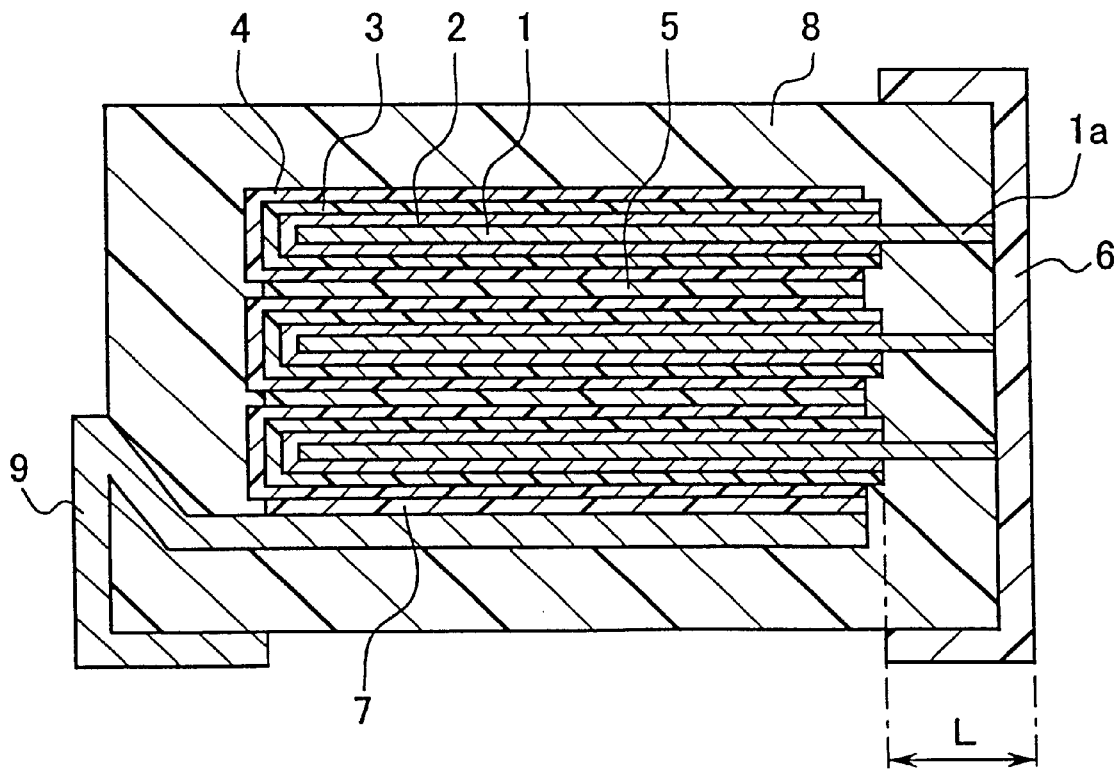
FIG. 1B is a cross-sectional view thereof.

FIG. 1A is a perspective view showing a solid electrolytic capacitor according to the first embodiment of the present invention. FIG. 1B is a cross-sectional view taken along line I—I in FIG. 1A. In the solid electrolytic capacitor, a laminate in which a plurality of capacitor units are laminated is sealed with a sealing body.

A capacitor unit is provided with an anode 1, a dielectric layer 2 formed on the surface of the anode 1, and a solid electrolytic layer 3 formed on the dielectric layer 2. Furthermore, it is preferable that a cathode layer 4 is formed on the solid electrolytic layer 3. Furthermore, one end portion of the anode 1 forms a lead portion 1a (hereinafter, "an anode lead" will be referred to). This portion is covered directly with the sealing body or covered with a sealing body via an oxide film that is made of the same material as the dielectric layer 2.

For the anode 1, for example, a valve metal such as aluminum, tantalum, titanium, niobium, and the like are used. Above all, aluminum is preferred because it is easily available and can be processed into a foil easily. Furthermore, it is preferable that the anode 1 is provided with a plurality of pores communicating to the outer surface. This is preferable because it is possible to increase the surface area of the anode and to increase capacitance. When aluminum is used, the anode 1 can be produced by carrying out a process for roughening the surface, for example, an electrolytic etching, a chemical etching, a blasting, or the like. When tantalum or niobium is used, the anode 1 can be produced by press molding the powder of tantalum or niobium followed by sintering the resultant molded body.

The dielectric layer 2 can be formed of an oxide film of the valve metal constituting the anode 1. The dielectric layer 2 is formed on the entire surface including a porous surface of the anode 1 except for an anode lead 1a for electrically connecting to the anodic terminal. In some process, since the anode lead 1a can be connected to the anodic terminal on the end face exposed to the outside, an oxide film is formed also on the anode lead 1a. The dielectric layer 2 can be formed by anodizing the anode 1.

The solid electrolytic layer 3 is a member constituting a cathode of the solid electrolytic capacitor and formed on the surface of the dielectric layer 2 (including the surface inside the pores). Even when an oxide film is formed on the anode lead 1a in order to insulate from the anodic terminal, the solid electrolytic layer is not formed on the anode lead 1a.

The solid electrolytic layer 3 can be formed of, for example, a conductive polymer. The conductive polymer is a polymer expressing the conductivity by itself, and can be formed by polymerizing monomers on the surface of the dielectric layer. An example of the conductive polymers includes a polymer of a heterocyclic five-membered ring compound. More specifically, polypyrrole, polythiophene, poly-3-alkyl thiophene, and polyisothianaphthene, etc. and derivatives thereof preferably are used. Furthermore, a polymer of a six-membered ring compound exhibiting conductivity, for example, polyparaphenylene, polyaniline, polyparaphenylene vinylene, etc. and derivatives thereof may be used. Furthermore, it is preferable that a dopant may be added to the conductive polymers in order to improve the conductivity of the polymer and to reduce the resistance. As the dopant, for example, an aryl sulfonate ion such as alkyl naphthalene sulfonate, paratoluene sulfonate, etc., an aryl phosphate ion, or the like can be used.

The solid electrolytic layer 3 also can be formed of manganese dioxide. It can be formed by thermally decomposing a manganese salt such as manganese nitrate on the surface of the dielectric layer 2. However, for achieving high-frequency response characteristics, it is preferable that the conductive polymer is used for the solid electric layer.

The cathode layer 4 is a member having a cathode electricity collector function and is formed on the surface of the solid electrolytic layer 3. For the cathode layer 4, a conductive paste such as a carbon paste, a silver paste, and the like may be used. Furthermore, the cathode layer 4 may have a single layer structure or a laminate structure. However, for achieving high-frequency response characteristics, in order to realize a collecting property with a low resistance, a multi-layer structure including a carbon paste and a silver paste is preferred.

A plurality of the capacitor units are laminated to form a unit laminate. The number of capacitor units to be laminated is not particularly limited and can appropriately be set in accordance with the desired capacitance.

In this unit laminate, it is preferable that a conductive adhesive 5 is interposed between the capacitor units and the cathode layers 4 are adhered to each other via the conductive adhesive 5. Furthermore, the kind of the conductive adhesives 5 is not particularly limited. However, a silver adhesive etc. is preferred because the capacitor units are connected to each other with low resistance.

The unit laminate is sealed by a sealing body 8. An example of the sealing body 8 includes, for example, resin, ceramics and the like. Furthermore, as a method for forming the sealing body, for example, a method of molding a unit laminate with a resin, a method of inserting the unit laminate into a resin case, ceramic case or the like is used, followed by sealing thereof.

A part of the anode lead 1a of each capacitor unit is exposed on the surface of the sealing body 8 and an anodic conductive elastic body 6 is formed so as to cover the exposed portion of the anode lead. Furthermore, a cathodic extraction terminal 9 is connected to the unit laminate. Apart of the cathodic extraction terminal 9 is exposed to the outside of the sealing body 8. The following are the explanations of structures of extracting the anode and cathode.

Figure 2A:
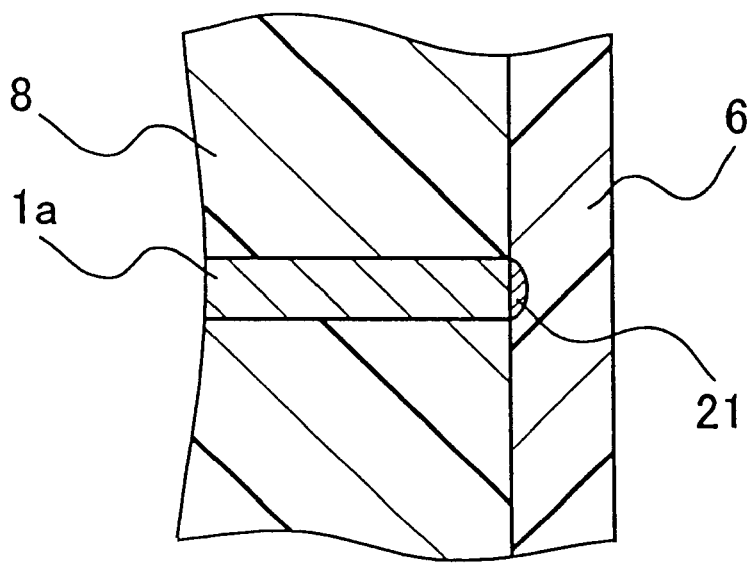
FIGS. 2A and 2B are partially cross-sectional views of an example of the solid electrolytic capacitor shown in FIGS. 1A and 1B.

First, a structure of extracting the anode will be explained. FIG. 2A is a partially cross-sectional view of an anodic extracting portion in the solid electrolytic capacitor. As shown in FIG. 2A, the anode lead 1*a* of each capacitor unit is extracted to the outside of the sealing body 8, respectively. In other words, a part of each anode lead 1*a* is exposed to the outside of the sealing body 8. The exposed portion of the anode lead 1*a* is connected to the anodic conductive elastic body 6 formed outside the sealing body 8 via a plating layer 21. Herein, the anodic conductive elastic layer 6 is closely attached to the sealing body 8 except for the exposed portion of the anode lead 1*a* for improving the connecting strength with respect to the sealing body 8.

The kind of the plating layer 21 is not particularly limited as long as it has a function of stabilizing a state in which a natural oxide film of the anode lead 1*a* is removed. An example of the plating layer 21 includes, for example, a nickel plating layer, a copper plating layer, a zinc plating layer, a silver plating layer, a tin plating layer, a gold plating layer, a solder plating layer and the like. Above all, in order to improve the effect of preventing the formation of natural oxide films, a nickel plating layer, a copper plating layer and a zinc plating layer are preferred. In order to achieve close adhesion and low resistance connection with respect to the anodic conductive elastic body, a gold plating layer and a silver plating layer are preferred. The nickel plating layer herein denotes a plating layer including a nickel as a main component, and may include accessory components. The same is true in the other kinds of plating layers.

Figure 2B:
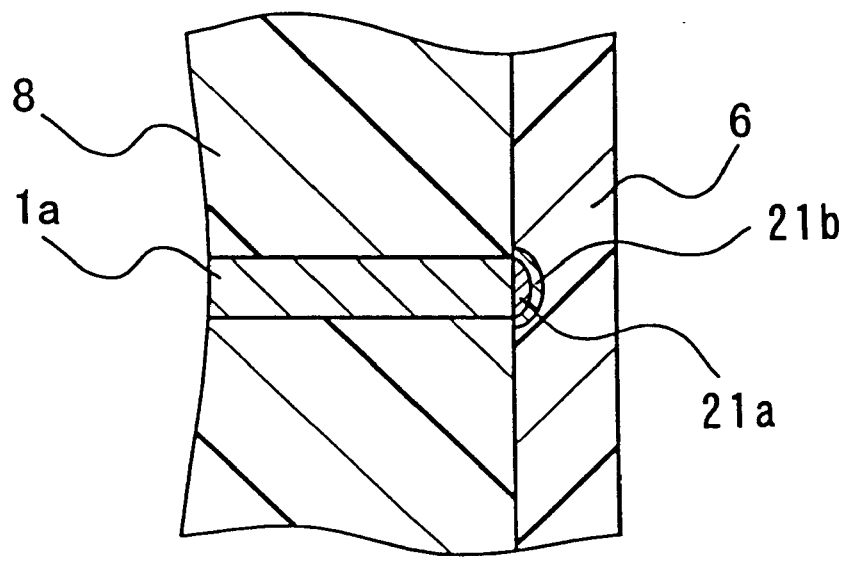

Furthermore, as shown in FIG. 2B, the plating layer may have a multi-layer structure. In this case, as a layer 21*a* that is in contact with the anode lead, a material that is likely to be formed on the anode lead surface, for example, a nickel plating layer, a copper plating layer, a zinc plating layer, and the like are preferably used. As a layer 21*b* that is in contact with the anodic conductive elastic body, a material that is well connected to the conductive elastic layer electrically and physically, for example, a gold plating layer, a silver plating layer, and the like are preferably used. Thereby, it is possible to optimize both an effect of preventing the formation of the natural oxide film and an effect of reducing the interface resistance with respect to the anodic conductive elastic body.

The anodic conductive elastic body 6 is not particularly limited as long as it has an elastic body having conductivity. However, as the anodic conductive elastic body 6, for example, a conductive resin, a conductive paste, conductive painting, conductive rubber, and the like may be used. In particular, in order to obtain the low resistance property, a material having high conductivity is preferred. Specifically, it is preferable to use a conductive resin including at least one selected from the group consisting of silver powder, copper powder and carbon powder. In particular, for preventing the ionic migration, a conductive resin including carbon powder is preferred, and for obtaining high conductivity, a conductive resin including silver powder is preferred. The anodic conductive elastic body 6 does not necessarily cover the entire portion of the end face of the sealing body 8. The anodic conductive elastic body 6 can be formed so that it covers the exposed portion of the anode lead 1*a*. Furthermore, for improving the connecting strength between the anodic conductive elastic body 6 and the sealing body 8, it is preferable that the anodic conductive elastic body 6 covers around the sealing body 8 from the upper and lower sides.

Furthermore, as the anodic conductive elastic body 6, a material that is highly adhered to the sealing body 8 is preferably used. Therefore, when the sealing body 8 is formed of a resin, it is preferable that the same kind of a resin constituting a sealing body is used for the resin constituting a conductive resin.

This structure of the extracting anode can be formed, for example, as follows. First, a sealing body 8 is formed so as to cover the unit laminate, and a part of the anode lead 1*a* is exposed to the end face of the sealing body 8 by a method such as an end face polishing or the like. Then, a portion of the anode lead 1*a* exposed to the end face of the sealing body 8 is provided with a plating layer 21. As the methods for forming the plating layer 21, any one of an electrolytic plating, an electroless plating may be employed. However, from the viewpoint of the efficiency, the electroless plating is preferred. In particular, aluminum is used for the anode 1, it is preferable that a nickel plating layer or a copper plating layer is formed by the electroless plating. Furthermore, it is preferable that prior to the formation of the plating layer 21, the surface of contamination on the anode lead 1*a* is removed with a degreasing agent. Furthermore, it is preferable that a metal such as zinc, which is likely to be alloyed with aluminum, is substitution plated in advance and a natural oxide film is removed from the surface by alloying. Furthermore, after a plating layer 21 is formed, the anodic conductive elastic body 6 is formed by coating of the conductive resin, curing, or the like on the surface on which the anode lead 1*a* is exposed.

Because such a structure of the extracting anode is employed, it is possible to realize the electric integration of the anode by exposing the anode lead to the outside of the sealing body, respectively, and forming the anodic conductive elastic body on the exposed portion. Therefore, unlike the conventional structure (see FIG. 13B), a space for bundling anode leads can be omitted, thus realizing the large capacitance. Furthermore, by connecting the anode lead to the anodic conductive elastic body via the plating layer, the anode can be integrated electrically in a state in which the oxide film on the anode lead surface is removed. Therefore, it is possible to provide a solid electrolytic capacitor with low resistance and high-frequency response characteristics.

Furthermore, by using a conductive elastic body having a high adhesive strength with respect to the sealing body as the anodic terminal, it is possible to produce a solid electrolytic capacitor that also has a high connecting reliability. Furthermore, for integrating the anode, a means having less thermal effect than that of the metal welding can be employed. An example of such means includes, for example, coating of a conductive resin, curing, and the like. Thus, an industrially practical connection can be carried out without deteriorating the property of the products. Furthermore, in the anodic conductive elastic body, it is possible to relax physical stress that occurs in production process, thermal stress that occurs when the final product is mounted on a substrate, or the like, which makes it possible to improve the connection reliability.

Next, a structure of extracting a cathode will be explained. As mentioned above, a cathodic extraction terminal 9 is connected to the unit laminate via the conductive adhesive 7. Furthermore a part of the cathodic extraction terminal 9 is extracted to the outside of the sealing body 8.

The location of the cathodic extraction terminal 9 is not particularly limited as long as it is connected electrically to the cathode layer 4 of the capacitor unit. For example, as shown in FIG. 1B, the cathode extracting terminal 9 can be located so that it covers at least a part of the surface of the laminate perpendicular to the direction in which the capacitor units are laminated.

Furthermore, as the cathodic extraction terminal 9, for example, iron, copper, nickel, stainless steel, or the like can be used. Furthermore, the kind of the conductive adhesive to be interposed between the cathodic extraction terminal and cathode layer is not particularly limited. However, silver adhesive is preferred.

In this embodiment, the case where the anodic conductive elastic body and the cathodic extraction terminal are used for the terminal electrode of the final product is explained. However, the present invention is not necessarily limited to this structure. For example, the resultant device is made to be an internal device and an extraction electrode is attached thereto and resin molded, and the extraction electrode may be used as a terminal electrode.

(Second Embodiment)

Figure 3A:
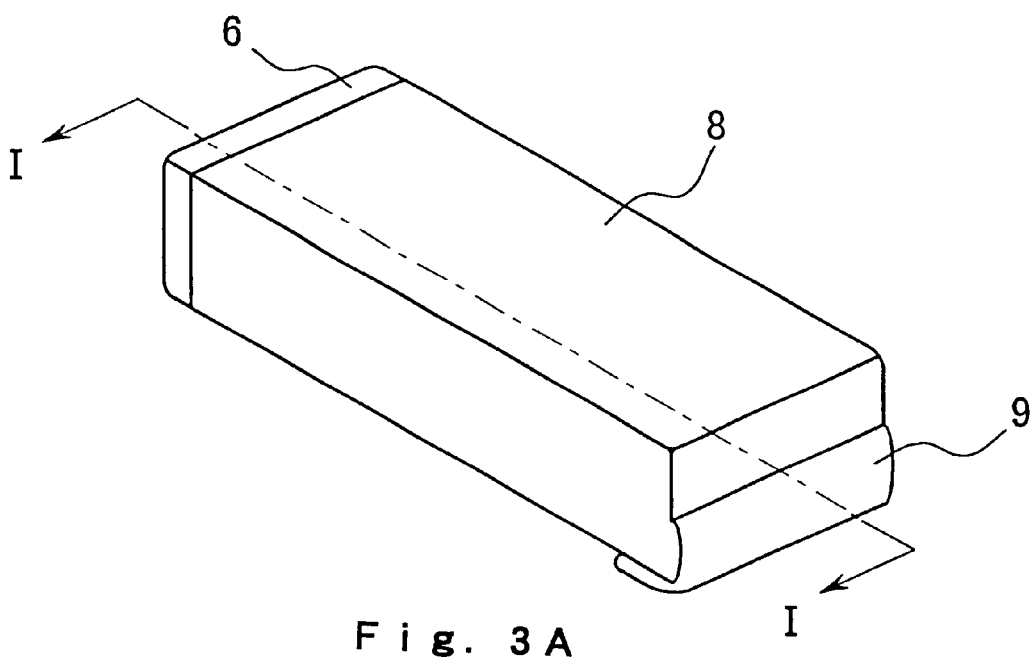
FIG. 3A is a perspective view of an example of a solid electrolytic capacitor according to a second embodiment.
Figure 3B:
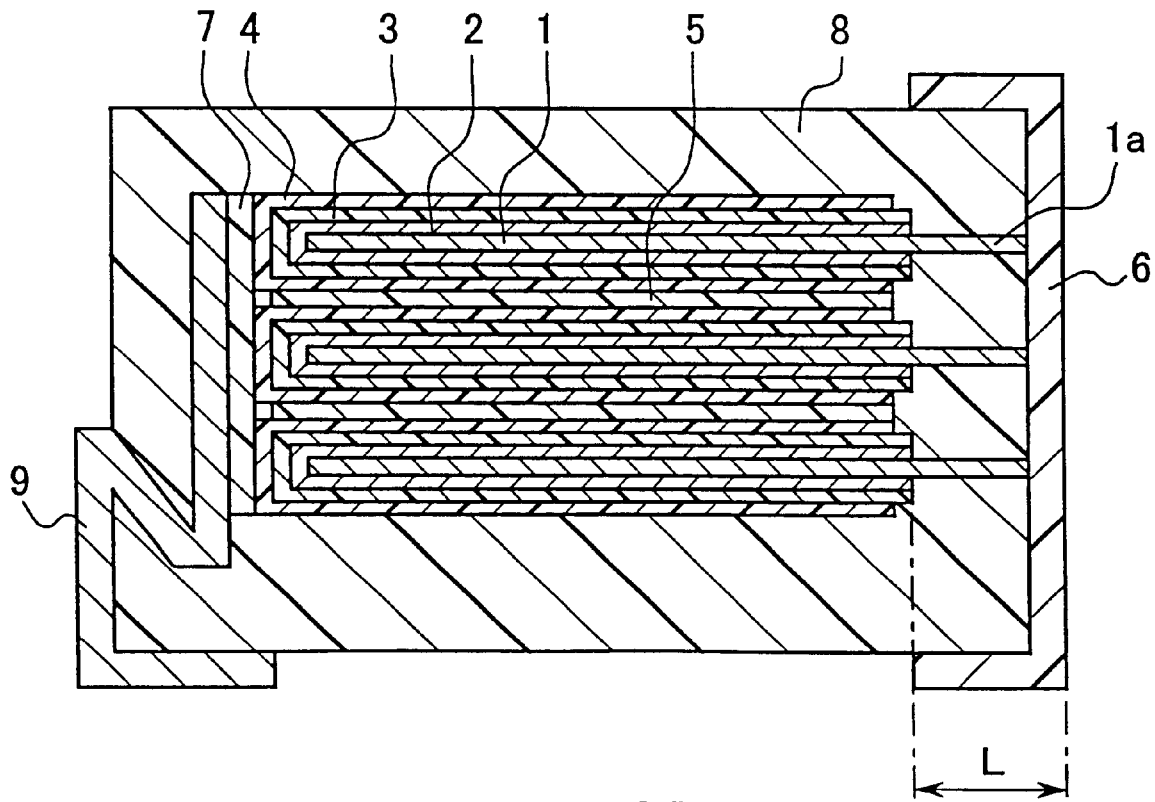
FIG. 3B is a cross-sectional view thereof.

FIG. 3A is a perspective view showing a solid electrolytic capacitor according to the second embodiment of the present invention. FIG. 3B is a cross-sectional view taken along line I—I in FIG. 3A. In the solid electrolytic capacitor, a laminate in which a plurality of capacitor units are laminated is sealed with a sealing body. The structure of the capacitor unit and the unit laminate is the same as in the first embodiment.

A part of the anode lead 1a of each capacitor unit is exposed on the surface of the sealing body 8 and the exposed portion is connected to the anodic conductive elastic body 6 via a plating layer. The structure of the extracting anode is the same as in the first embodiment.

A cathodic extraction terminal 9 is connected to the unit laminate via a conductive adhesive 7. Furthermore, a part of the cathodic extraction terminal 9 is extracted to the outside of the sealing body 8.

As shown in FIG. 3B, the cathodic extraction terminal 9 is located so as to cover at least a part of the side face of the laminate parallel to the direction in which the capacitor units are laminated (hereinafter, "side face" also will be referred to) so that the cathodic extraction terminal 9 is directly connected to the cathode layer 4 of all the capacitor units constituting the laminate via the conductor adhesive 7. Thus, by connecting the cathodic extraction terminal 9 directly to the cathode layer 4 of all the capacitor units, it is possible to extract the capacitance from each capacitor unit with low resistance, and to thus obtain a capacitor with excellent high-frequency response characteristics.

As mentioned above, the shape of the cathodic extraction terminal 9 is not particularly limited as long as it can cover the side face of the laminate. Furthermore, the cathodic extraction terminal 9 is not required to cover the entire surface of the side face of the laminate and may cover at least one portion thereof. The area to be covered (coverage) is not particularly limited. If the resistance of the cathodic extraction terminal 9 itself is satisfactory low, it is possible to realize the satisfactory low resistance by covering about 10% of one side face of the laminate.

Figure 4A:
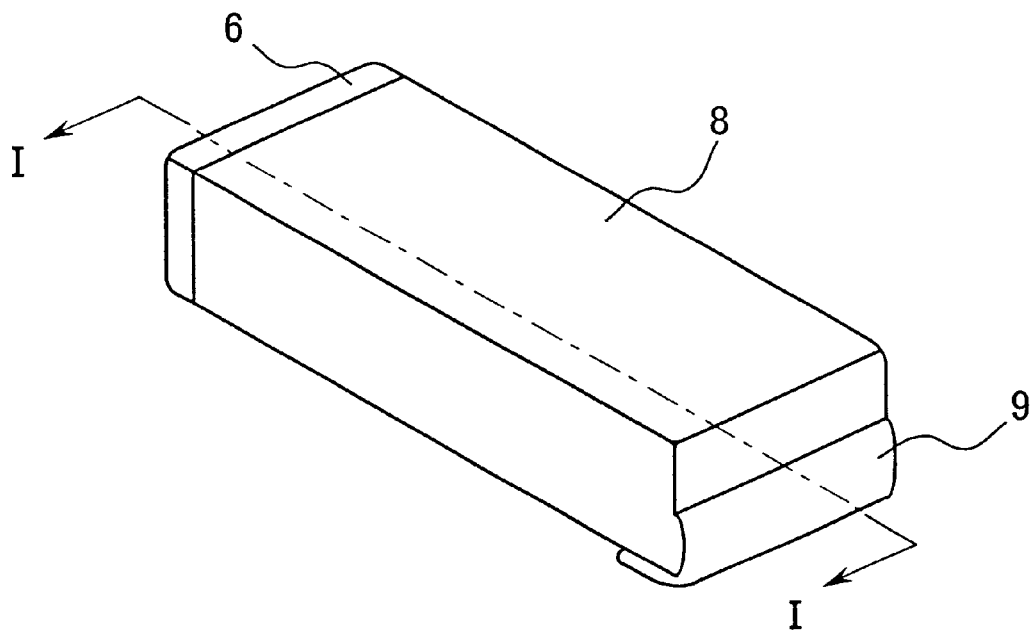
FIG. 4A is a perspective view of another example of a solid electrolytic capacitor according to a second embodiment.
Figure 4B:
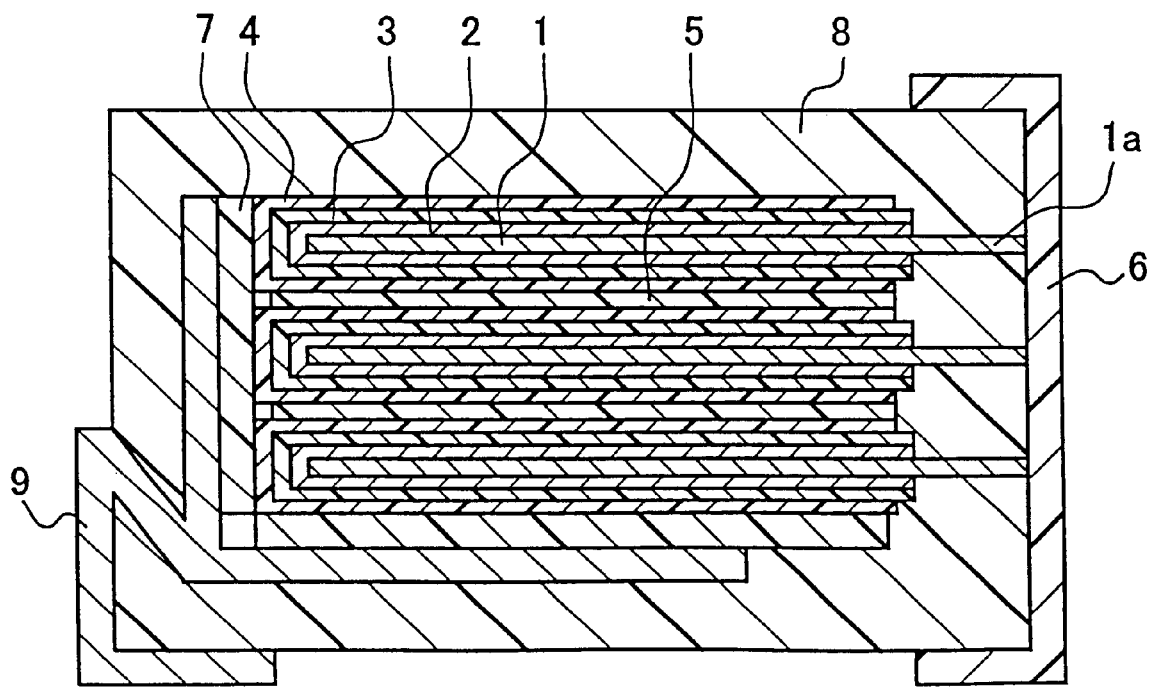
FIG. 4B is a cross-sectional view thereof.

Furthermore, the cathodic extraction terminal 9 may be formed so as to cover a plurality of side faces of the unit laminate instead of covering only one side face of the unit laminate. Furthermore, the cathodic extraction terminal 9 can be formed so that it can cover not only the side face of the unit laminate but also the surface of the laminate perpendicular to the direction in which the capacitor units are laminated. FIG. 4A is a perspective view showing a solid electrolytic capacitor having such a structure; and FIG. 4B is a cross sectional view taken along line I—I in FIG. 4A.

Figure 5A:
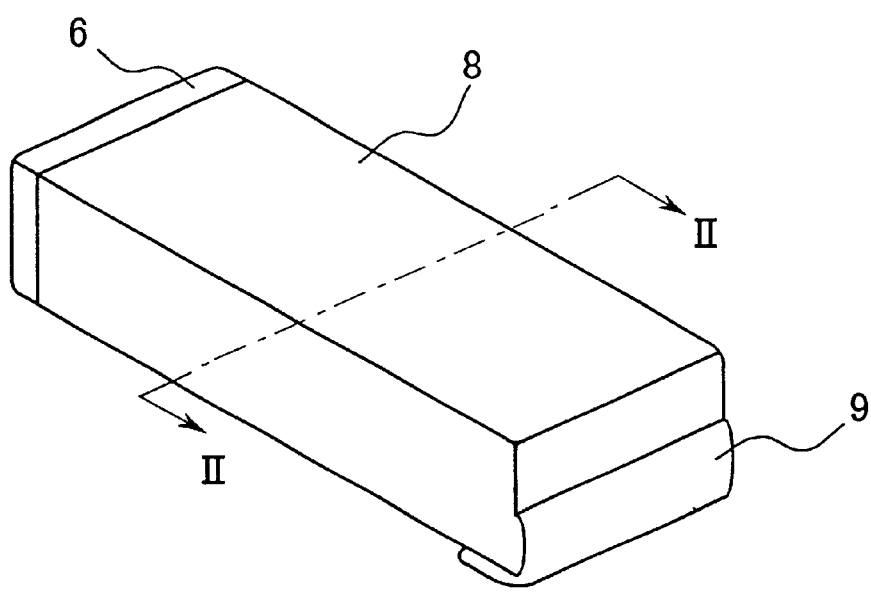
FIG. 5A is a perspective view of a further example of a solid electrolytic capacitor according to a second embodiment.
Figure 5B:
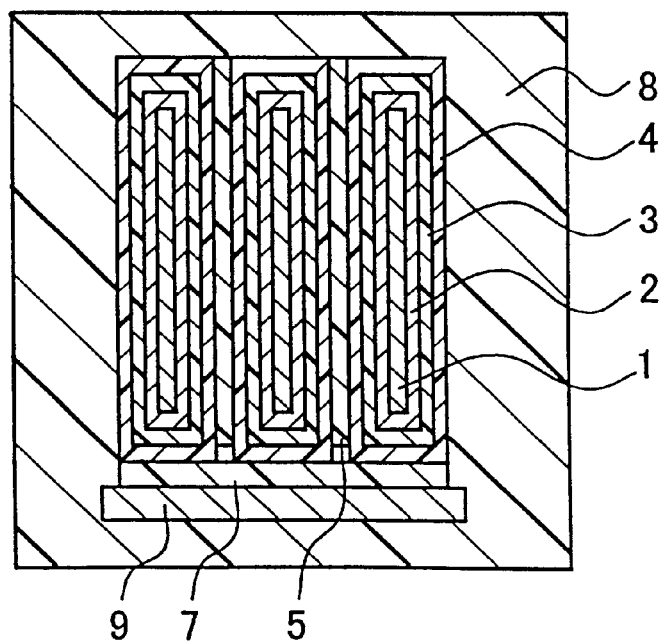
FIG. 5B is a cross-sectional view thereof.

Furthermore, the portion where the cathodic extraction terminal is located is not particularly laminated as long as it covers at least one side face of the laminate. FIG. 5A is a perspective view of a further example of a solid electrolytic capacitor according to this embodiment, and FIG. 5B is a cross-sectional view taken along line II—II in the FIG. 5A. As shown in this figure, a laminate is formed by laminating a plurality of capacitor units in the direction of the width of the solid electrolytic capacitor (in the II—II direction) and the cathodic extraction terminal may be arranged on the side face of the laminate.

In this embodiment, the case where the anodic conductive elastic body and the cathodic extraction terminal are used for the terminal electrode of the final product is explained. However, the present invention is not necessarily limited to this structure. For example, the resultant device is made to be an internal device and an extraction electrode is attached thereto and resin molded, and the extraction electrode may be used as a terminal electrode.

(Third Embodiment)

Figure 6A:
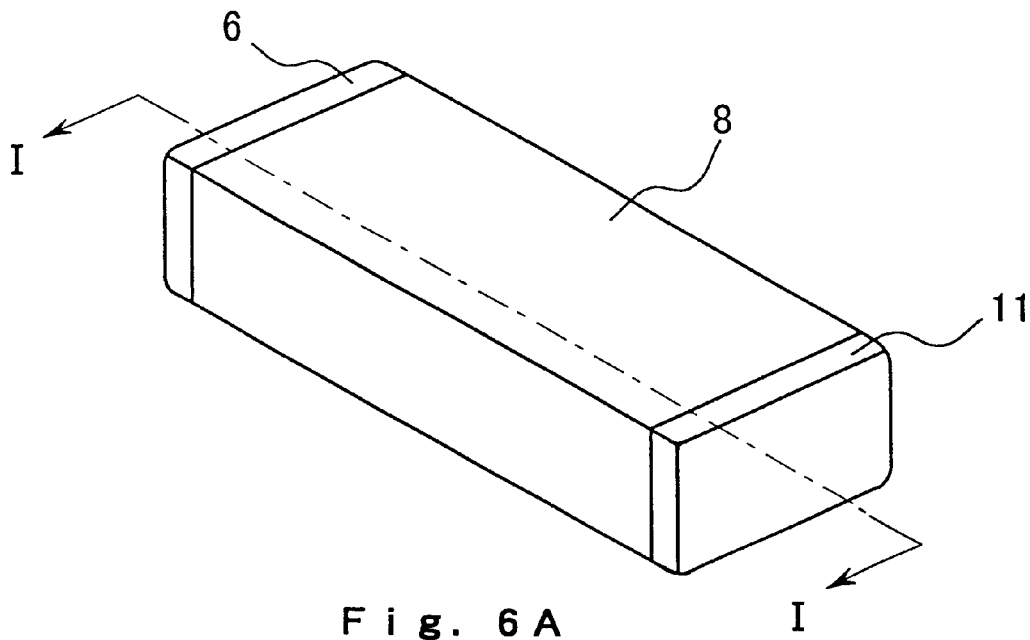
FIG. 6A is a perspective view of an example of a solid electrolytic capacitor according to a third embodiment.
Figure 6B:
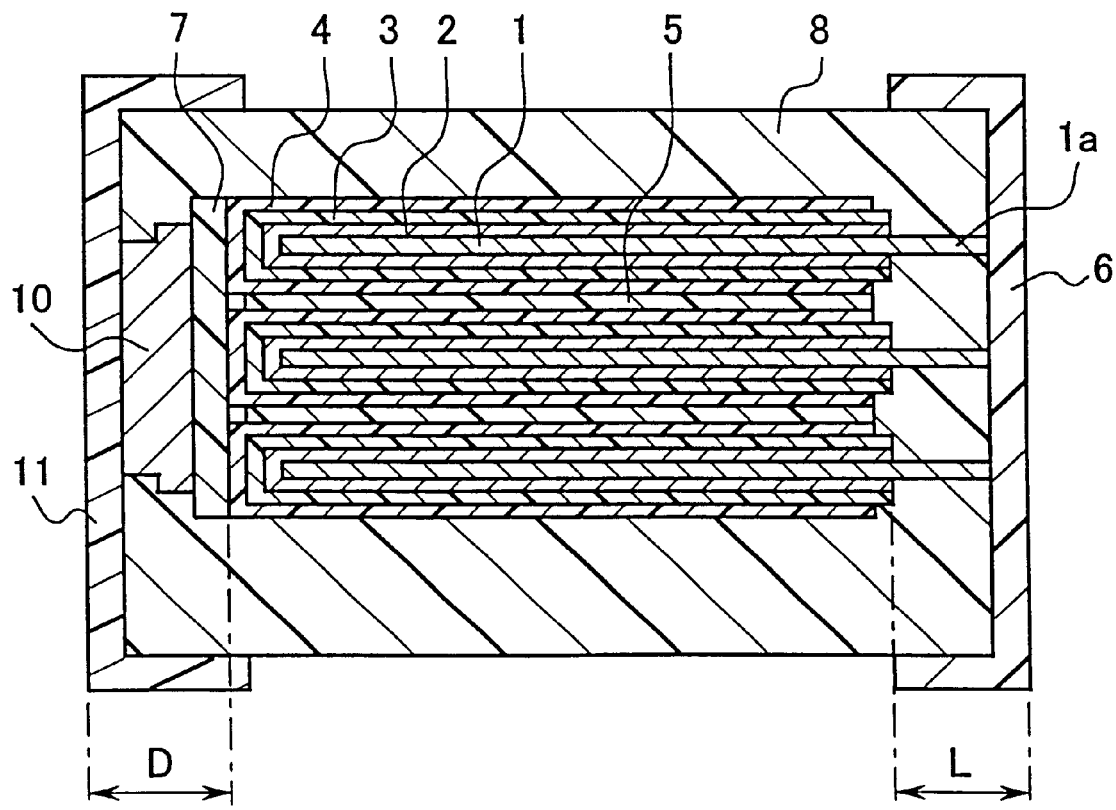
FIG. 6B is a cross-sectional view thereof.

FIG. 6A is a perspective view of a solid electrolytic capacitor according to a third embodiment of the present invention, and FIG. 6B is a cross-sectional view taken along line I—I in FIG. 6A. In the solid electrolytic capacitor, a unit laminate in which a plurality of capacitor units are laminated is sealed with a sealing body. The structure of the capacitor unit and unit laminate are the same as in the first embodiment.

A part of the anode lead 1a of each capacitor unit is exposed on the surface of the sealing body 8, and the exposed portion is connected to an anodic conductive elastic body 6 via the plating layer. Furthermore, the structure of extracting an anode is the same as in the first embodiment.

A metal chip 10 is connected to the unit laminate via the conductive adhesive 7. Furthermore, a part of the metal chip 10 is exposed on the surface of the sealing body 8 and a cathodic conductive elastic body 11 is formed so as to cover the exposed portion.

The metal chip 10 is provided so as to cover at least a part of a side face of the laminate parallel to the direction in which the capacitor units are laminated (hereinafter "side face" will also be referred) so that the metal chip 10 is directly connected to the cathode layer 4 of all the capacitor units constituting the laminate via the conductive adhesive 7. Thus, by connecting the metal chip 10 directly to the cathode layer 4 of all the capacitor units constituting the laminate, the extraction of capacitance from each capacitor unit can be carried out with low resistance, and a capacitor with excellent high-frequency response characteristics can be obtained. In particular, in this embodiment, since the metal chip is used for the extraction of the cathode, a path for extracting a cathode can be short and thick, and thereby it is possible to realize the extraction of capacitance with lower resistance and to realize excellent high-frequency response characteristics.

As mentioned above, the shape of the metal chip 10 is not particularly limited as long as it can cover at least a part of the side face of the laminate. For example, the metal chip may have a rivet shape, a plate shape, or the like. Furthermore, the metal chip 10 does not necessarily cover the entire surface of the side face of the laminate. It may cover at least a part of the side face. The area to be covered (coverage) is not particularly limited. If the resistance of the metal chip 10 itself is sufficiently low, it is possible to realize the satisfactory low resistance by covering about 10% of one side face of the laminate. Furthermore, the material of the metal chip 10 is not particularly limited as long as it is not melted when the solid electrolytic capacitor is mounted on the substrate. However, for realizing the low resistance connection, the material preferably contains gold or silver.

The conductive adhesive 7 for connecting the laminate to the metal chip 10 is not particularly limited. However, for reducing the connection resistance, a silver adhesive is preferably used.

Furthermore, for the material of the cathodic conductive elastic body 11 for covering the exposed portion of the metal chip 10, it is possible to use the same material as that used for the anodic conductive elastic body, for example, the material shown in the first embodiment. Furthermore, the cathodic conductive elastic body 11 is not required to cover the entire surface of the sealing body 8 but may cover a part of the exposed portion of the metal chip 10 and be electrically connected to the sealing body 8. For improving the connecting strength between the sealing body 8 and the cathodic conductive elastic body 11, as shown in FIG. 6B, it is preferable that the conductive elastic body 6 covers around the sealing body from the upper and lower sides.

Furthermore, between the metal chip 10 and the cathodic conductive elastic body 11, a plating layer may be interposed. An example of the plating layer includes, for example, a nickel plating layer, a copper plating layer, a zinc plating layer, a silver plating layer, a tin plating layer, a gold plating layer, a solder plating layer, and the like. Furthermore, a plating layer may be a single layer or a multi-layer.

Furthermore, in the structure of FIGS. 6A and 6B, a part of the metal chip is exposed to the outside of the sealing body. In place of such a structure, an extraction terminal may be electrically connected to the metal chip and a part of the extraction terminal may be exposed to the outside of the sealing body.

Figure 7A:
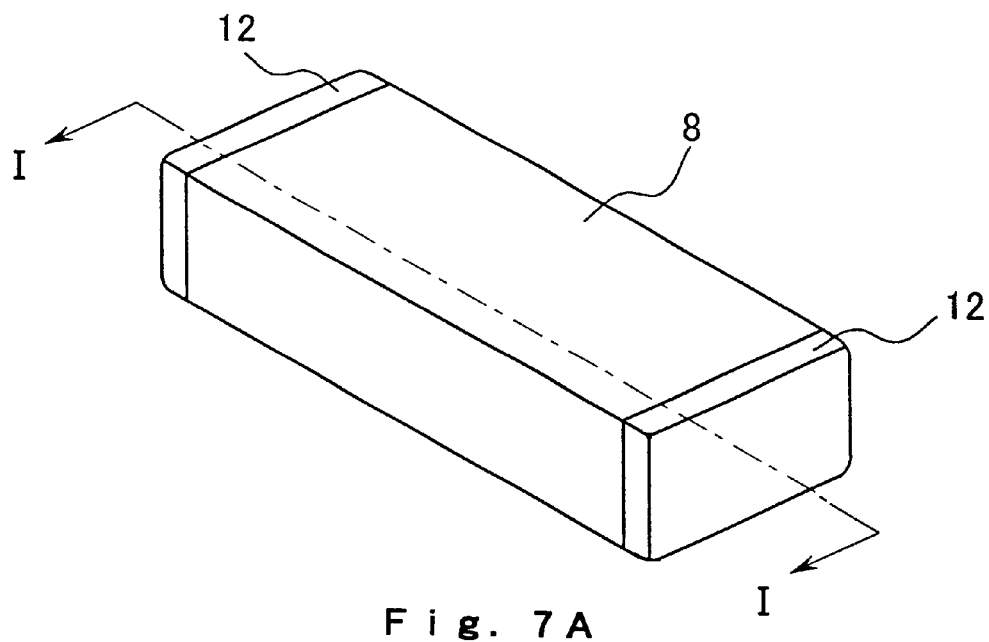
FIG. 7A is a perspective view of another example of a solid electrolytic capacitor according to a third embodiment.
Figure 7B:
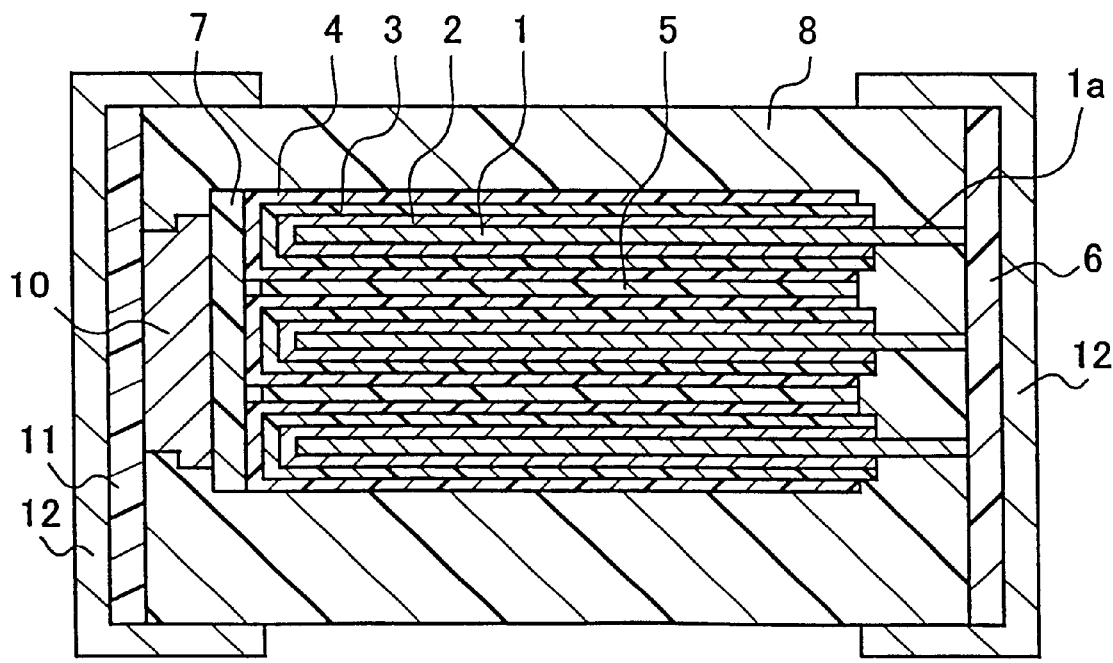
FIG. 7B is a cross-sectional view thereof.

FIG. 7A is a perspective view of another example of a solid electrolytic capacitor according to the third embodiment, and FIG. 7B is a cross-sectional view taken along line I—I in FIG. 7A. As shown in these figures, a metal electrode 12 further may be formed outside the anodic conductive elastic body 6 and the cathodic conductive elastic body 11. The conductive elastic body has a lower conductivity as compared with the metal. However, by adding the metal electrode, the resistance of the capacitance extraction can be lowered further. Thus, it is possible to provide a solid electrolytic capacitor with an excellent high-frequency response characteristics.

Furthermore, the conductive elastic body has an air permeability that is higher than the metal. If oxygen and humidity enters the inside the solid electrolytic capacitor, the characteristics of the solid electrolytic capacitor may be changed or deteriorated. Therefore, it is preferable to enhance the ability to shut out air. In this case, by covering the conductive elastic body with a metal electrode, the ability to shut out air can be enhanced, which makes it possible to provide a solid electrolytic elastic body with a long-term reliability. In particular, as shown in FIG. 7B, if the metal electrode 12 is formed in a cap shape, it is possible to enhance the ability to shut out air. Needless to say, the shape of the metal electrode is not necessarily limited to this shape, and even if the shape is appropriately changed in accordance with the other conditions, the effect of this embodiment can be obtained.

The material of the metal electrode 12 is not particularly limited. For ensuring the wettability with respect to solder using in mounting the substrate, at least the front surface of the metal electrode (the surface opposite to the surface that is in contact with the conductive elastic body) is formed of tin, solder or silver. The shape of metal electrode includes, for example, a plate shape, a cap shape, or the like. As the method for producing the metal electrode 12, for example, a method of attaching a metal plate, a method of attaching a metal cap, a method of forming a plating layer, and the like can be employed.

When the metal plate or metal cap is used as the metal electrode 12, it is preferable that the surface of the metal electrode that is in contact with the conductive elastic body is formed of silver or gold for reducing the resistance at the interface between the metal electrode 12 and the conductive elastic body. In this case, the metal plate or the metal cap per se may be gold or silver, or the surface of the metal plate of the cap is plated with gold or silver. In the latter case, the material of the main body of the metal plate or the cap is not particularly limited as long as it can maintain the strength without being melted when the substrate is mounted. Furthermore, when the material of the metal plate or metal cap has less adhesive strength with respect to gold or silver, it is preferable that a plating layer of a metal component that is easy to form an alloy of the material of the metal plate or metal cap and gold or silver is interposed as an intermediate plating layer to thus form a multi-layer plating. For example, when nickel is used for the material of the metal plate or metal cap and silver plating is carried out, the intermediate plating layer to be interposed therebetween is preferably a copper plating layer. This is preferable because the adhesive strength is improved and the layers do not peel off even when the mechanical stress is applied, and thus low resistance capacitance extraction can be realized. An example of the method for attaching the cap includes a method of fixing with a conductive adhesive, a method of fixing by caulking, and the like. Furthermore, conductive resin may be used as the conductive elastic body, the conductive resin is coated and the metal cap is attached, followed by curing the conductive resin so as to connect the conductive elastic body to the metal cap directly.

In this embodiment, the case where the conductive elastic bodies or the metal electrodes are used for the terminal electrode of the final product is explained. However, the present invention is not necessarily limited to this structure. For example, the resultant device is made to be an internal device and an extraction electrode is attached thereto and resin molded, and the extraction electrode may be used as a terminal electrode.

(Fourth Embodiment)

Figure 8A:
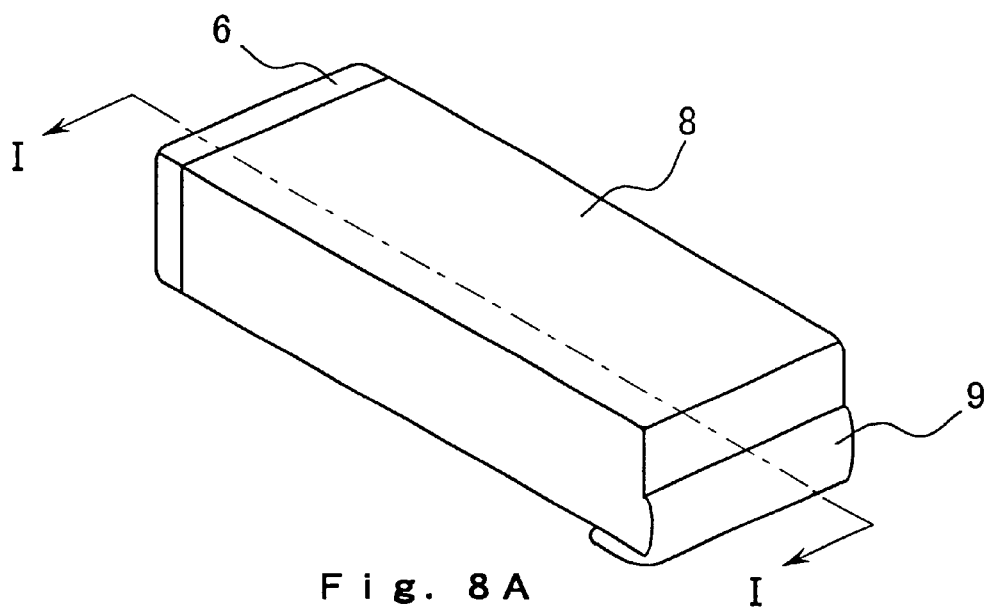
FIG. 8A is a perspective view of an example of a solid electrolytic capacitor according to a fourth embodiment.
Figure 8B:
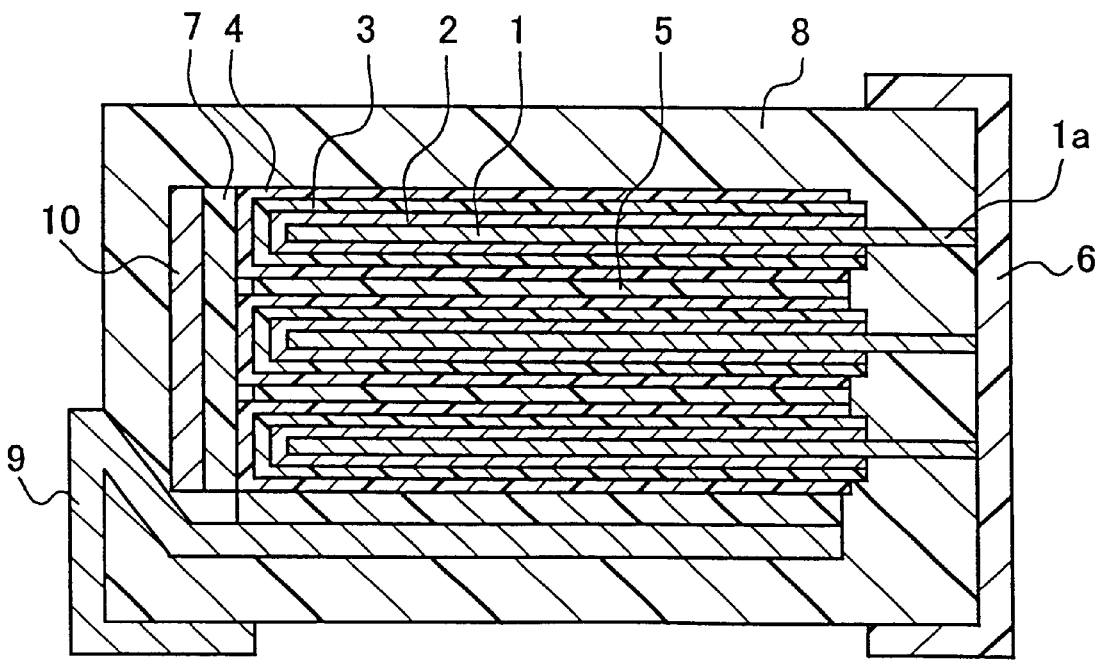
FIG. 8B is a cross-sectional view thereof.

FIG. 8A is a perspective view of an example of a solid electrolytic capacitor according to the fourth embodiment, and FIG. 8B is a cross-sectional view taken along line I—I of FIG. 8A. In this solid electrolytic capacitor, a unit laminate in which a plurality of capacitor units are laminated is sealed by the sealing body 8. The structures of the capacitor unit and unit laminate are the same as in the first embodiment.

A part of the anode lead 1*a* of each capacitor unit is exposed on the surface of the sealing body 8 and the exposed portion is connected to the anodic conductive elastic body 6 via a plating layer. The structure of extracting the anode is the same as in the first embodiment.

The cathodic extraction terminal 9 is connected to the unit laminate via the conductive adhesive 7, and a part of the cathodic extraction terminal 9 is exposed to the outside of the sealing body 8. Furthermore, a metal chip 10 is connected to the unit laminate via the conductive adhesive 7.

Furthermore, the metal chip 10 is provided so as to cover at least a part of a side face of the laminate parallel to the direction in which the capacitor units are laminated (hereinafter "side face" will also be referred) so that a metal chip 10 is directly connected to the cathode layer 4 of all the capacitor units constituting the laminate via the conductive adhesive 7.

Figure 9A:
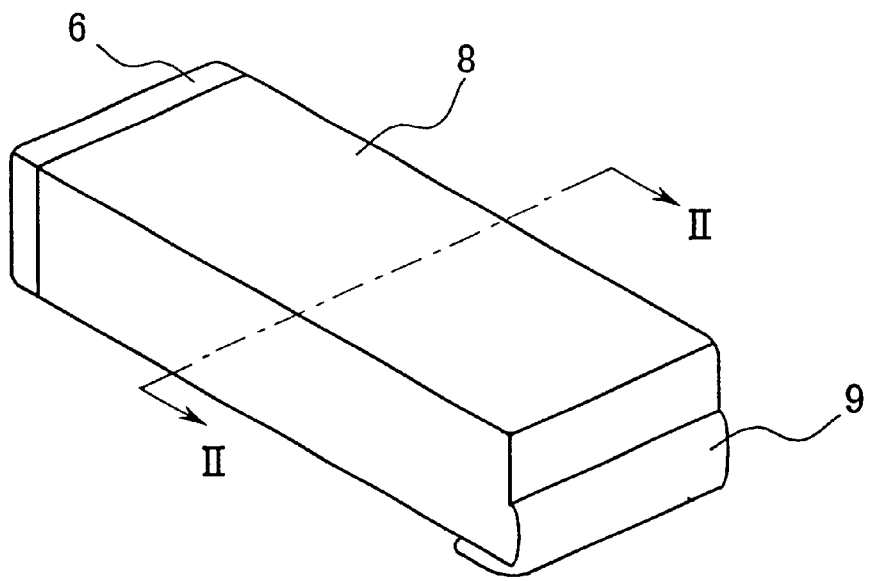
FIG. 9A is a perspective view of another example of a solid electrolytic capacitor according to a fourth embodiment.
Figure 9B:
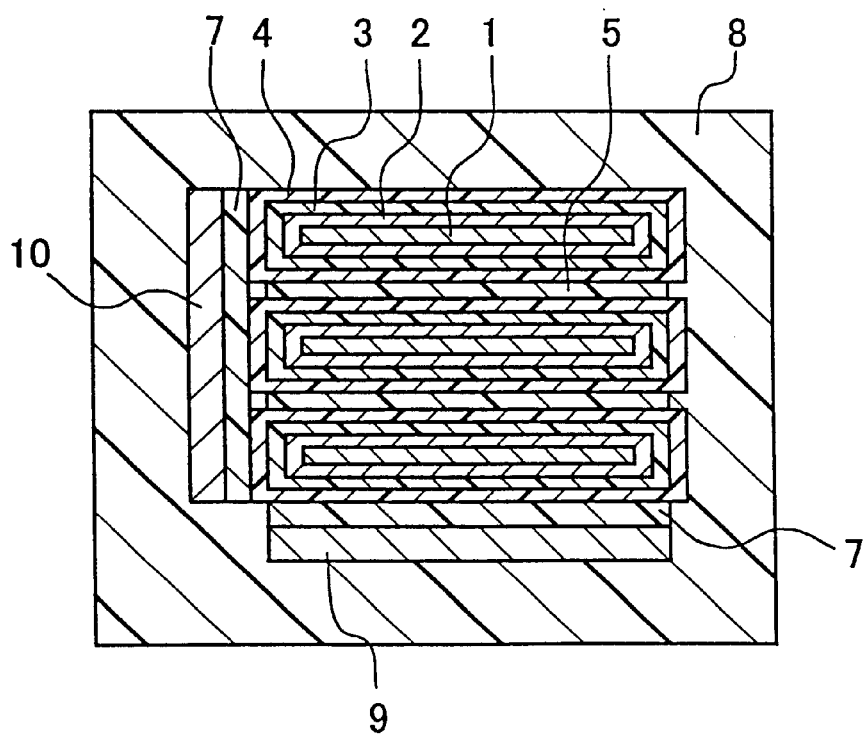
FIG. 9B is a cross-sectional view thereof.

The location where the metal chip 10 is arranged is not particularly limited as long as it covers at least one side face of the laminate. For example, as shown in FIG. 8B, the metal chip 10 can be arranged in the side face of the laminate that extends in the width direction of the solid electrolytic capacitor. The metal chip 10 may be arranged in the side face of the laminate that extends in the longitudinal direction of the solid electrolytic capacitor. FIG. 9A is a perspective view of a solid electrolytic capacitor having such a structure, and FIG. 9B is a cross-sectional view taken along line I—I in FIG. 9A.

Thus, by directly connecting the metal chip 10 to the cathode layer 4 of all the capacitor units constituting the laminate, it is possible to carry out the extraction of capacitance from each capacitor unit with low resistance and thus to obtain a capacitor with excellent high-frequency response characteristics. Moreover, the shape and material of the metal chip 10 is the same as in the third embodiment.

The location where the cathodic extraction terminal 9 is formed is not particularly limited as long as it is connected to the cathode layer 4 of at least one capacitor unit of the unit laminate via a conductive adhesive 7. For example, as shown in FIG. 8B, the cathode extraction terminal 9 may be connected to the cathode layer 4 of the capacitor unit constituting the bottom layer of the unit laminate.

The metal chip 10 is not connected necessarily directly to the cathodic extraction terminal 9 and may be electrically connected via the cathode layer 4 of at least one capacitor unit. However, for realizing lower resistance of the extraction of capacitance, it is preferable that the metal chip 10 is connected directly to the cathodic extraction terminal 9 via a conductive adhesive.

The conductive adhesive 7 for connecting the laminate to the metal chip 10 or the cathodic extraction terminal 9 is not particularly limited. However, for reducing the connection resistance, silver adhesive is preferred.

In this embodiment, the case where the anodic conductive elastic body and the cathodic extraction terminal are used for the terminal electrode of the final product is explained. However, the present invention is not necessarily limited to this structure. For example, the resultant device may be made to be an internal device and an extraction electrode is attached thereto and resin molded, and the extraction electrode may be used as a terminal electrode.

(Fifth Embodiment)

Figure 10A:
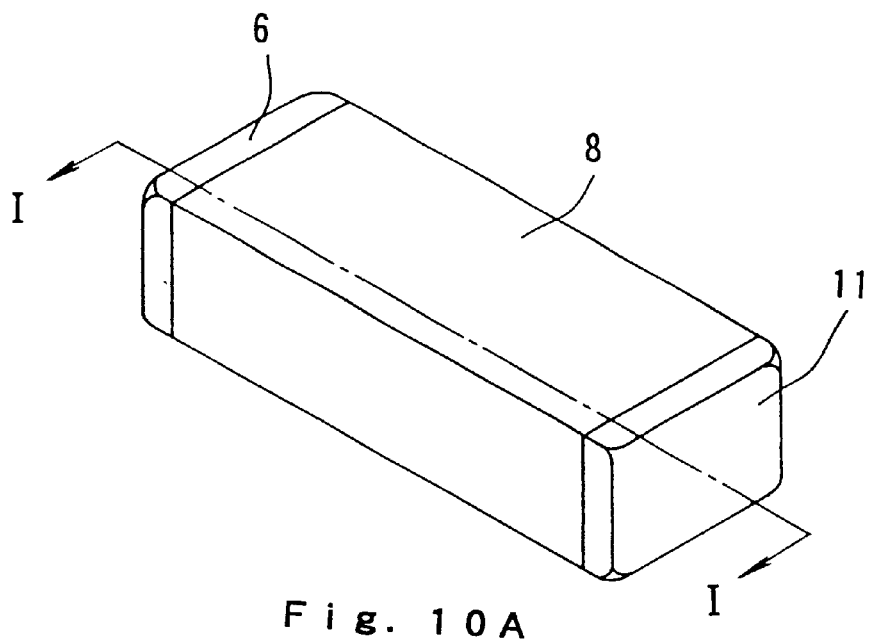
FIG. 10A is a perspective view of an example of a solid electrolytic capacitor according to a fifth embodiment.
Figure 10B:
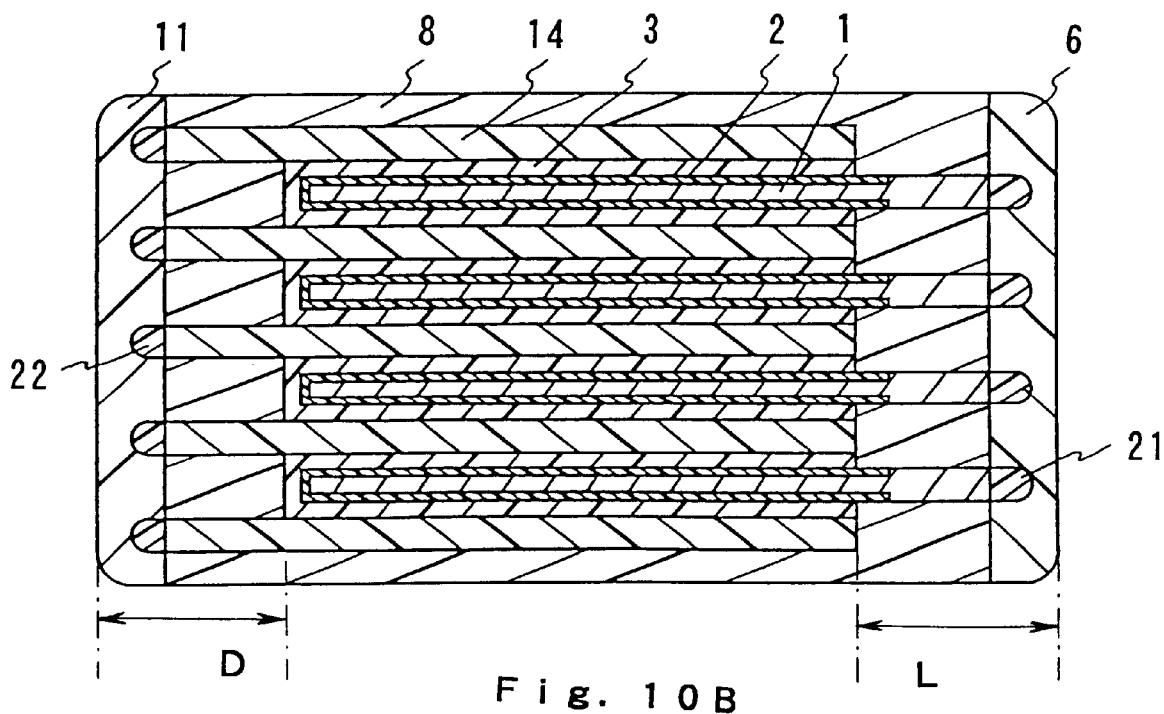
FIG. 10B is a cross-sectional view thereof.

FIG. 10A is a perspective view of an example of a solid electrolytic capacitor according to the fifth embodiment, and FIG. 10B is a cross-sectional view taken along I—I in FIG. 10B. In this solid electrolytic capacitor, a laminate in which a plurality of capacitor units are laminated is sealed by the sealing body 8.

The capacitor unit is provided with an anode 1, a dielectric layer 2 formed on the surface of the anode 1, and a solid electrolytic layer 3 formed on the dielectric layer 2. Furthermore, one end portion of the anode 1 forms a lead portion 1a, which is covered directly with the sealing body or covered with a sealing body via an oxide film that is made of the same material as the dielectric layer 2. The material and the formation method of the anode 1, the dielectric layer 2 and the solid electrolytic layer 3 are the same as in the first embodiment.

A plurality of the capacitor units are laminated so as to form a unit laminate. The number of the capacitor units to be laminated is not particularly limited and can be set appropriately in accordance with the desired capacitance.

In this unit laminate, a metal foil 14 is interposed between the capacitor units. This metal foil 14 is electrically connected to the solid electrolytic layer 3 and insulated from the anode 1 via the dielectric layer 2.

Furthermore, the metal foil 14 may be electrically connected to the solid electrolytic layer 3 via a conductive adhesive.

For the metal foil 14, for example, a metal foil or a metal plate can be used. A material having a small specific resistance and small ion migration is preferred. Specifically, nickel, copper, stainless steel, aluminum and the like are preferably used. Furthermore, when the metal foil 14 is formed of the same material as that of anode 1, easy production and the reduction of the cost can be realized. When the metal foil 14 is formed of a valve metal such as aluminum, the metal foil supporting a carbon powder on the surface is preferred. By supporting the carbon powder on the surface of the metal foil, electric connection with respect to the solid electrolytic layer with lower resistance can be realized.

As mentioned above, the unit laminate is sealed by the sealing body 8. The material and the formation method of the sealing body 8 are the same as in the first embodiment.

A part of the anode lead 1a of each capacitor unit is exposed on the surface of the sealing body 8 and the exposed portion is connected to the anodic conductive elastic body 6 via a plating layer 21. The structure of extracting the anode is the same as in the first embodiment.

Furthermore, each metal foil 14 is respectively extracted to the outside of the sealing body 8. In the other words, a part of each metal foil 14 is exposed to the outside of the sealing body 8. The exposed portion of the metal foil 14 is connected to the cathodic conductive elastic body 11 formed outside the sealing body via a plating layer 22. In this case, the cathodic conductive elastic body 11 is closely adhered to the sealing body 8 on the portion except for the exposed portion of the metal foil 14 in order to improve the connection strength with respect to the sealing body 8. Moreover, as the cathodic conductive elastic body 11, for example, the same material as that of the anodic conductive elastic body shown in the first embodiment can be used.

The kinds of the plating layer 22 are not particularly limited as long as it has a function of stabilizing a state in which a natural oxide film of the metal foil 14 is removed. An example of the kind of the plating layer 22 includes the same plating layer that is shown in the first embodiment as an example of the plating layer that is to be interposed between the anode lead and the anodic conductive elastic body can be used.

Apart of each metal foil 14 that is exposed to the outside of the sealing body 8 may be connected to the cathodic conductive elastic body 11 without the plating layer.

Figure 11A:
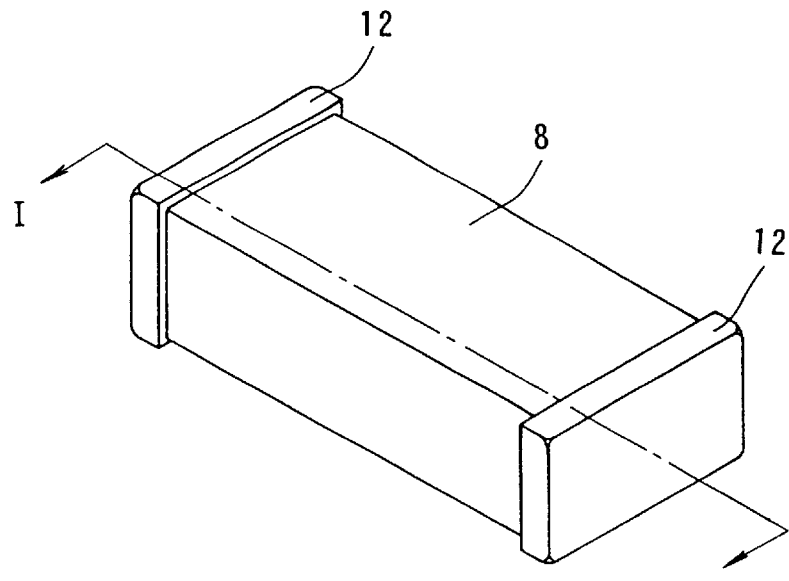
FIG. 11A is a perspective view of another example of a solid electrolytic capacitor according to a fifth embodiment.
Figure 11B:
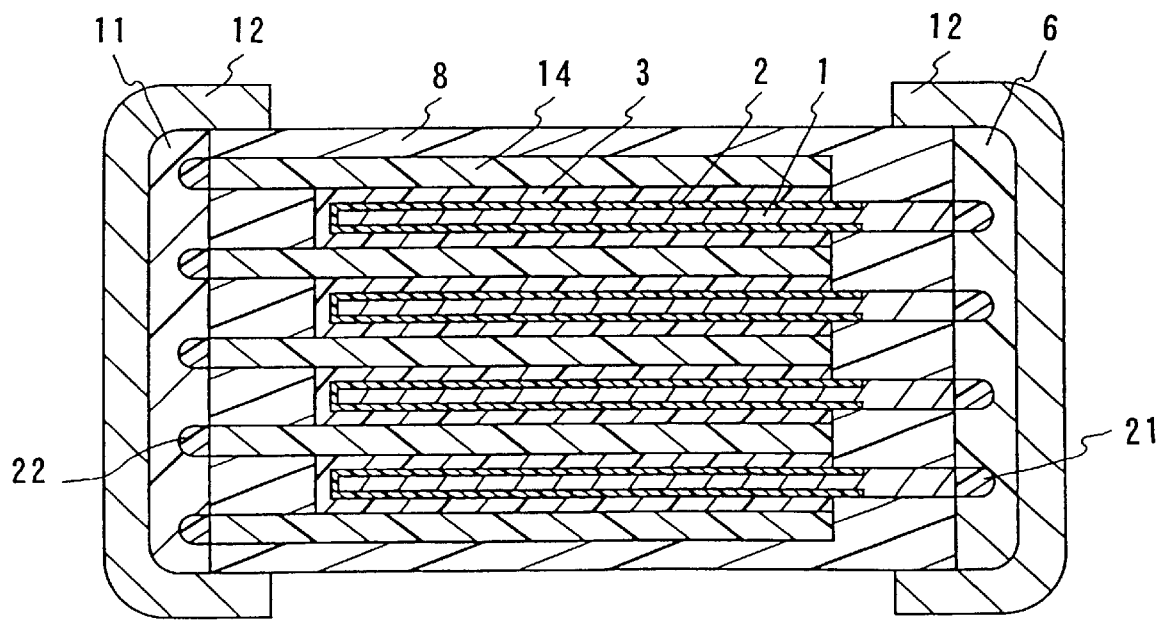
FIG. 11B is a cross-sectional view thereof.

FIG. 11A is a perspective view of another example of a solid electrolytic capacitor according to the fifth embodiment, and FIG. 11B is a cross-sectional view taken along line I—I in FIG. 11A. As shown in these figures, a metal electrode 12 further may be formed outside the anodic conductive elastic body 6 and the cathodic conductive elastic body 11. By providing the metal electrode 12, resistance of the extraction of the capacitance can further be lowered. In addition, it is possible to enhance the ability to shut out air. The material, shape and forming method of the metal electrode 12 may be the same as in the third embodiment.

In this embodiment, the case where the conductive elastic bodies or the metal electrodes are used for the terminal electrode of the final product is explained. However, the present invention is not necessarily limited to this structure. For example, the resultant device may be made to be an internal device and an extraction electrode is attached thereto and resin molded, and the extraction electrode may be used as a terminal electrode.

Figure 12:
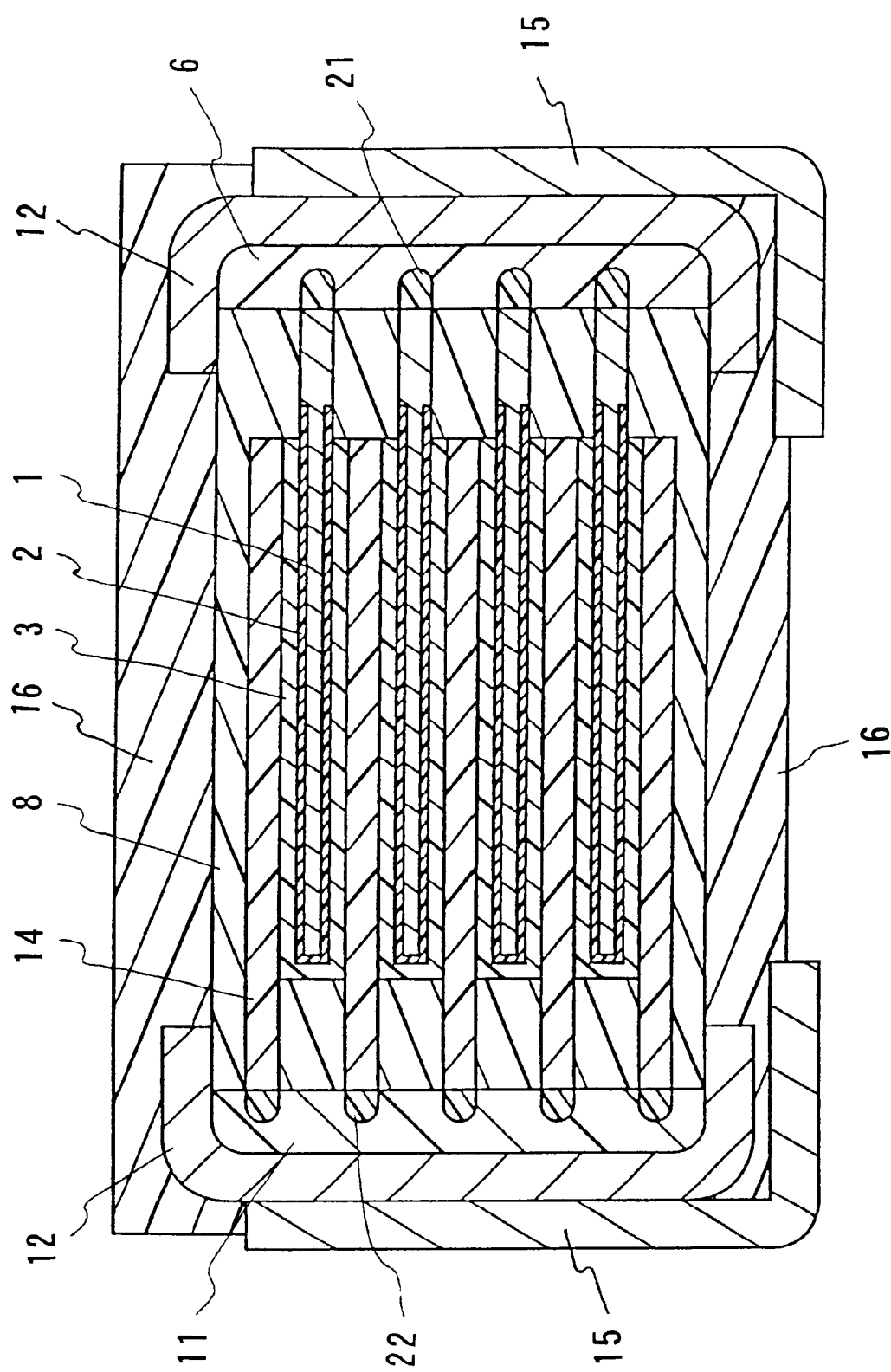
FIG. 12A is a cross-sectional view of a further example of a solid electrolytic capacitor according to a fifth embodiment.

Specifically, as shown in FIG. 12, the metal electrode 15 may be connected to the metal electrode 12 of the solid electrolytic capacitor and the entire solid electrolytic capacitor is further covered with another mold resin 16. The connection method between the metal electrode 12 and the metal electrode 15 is not particularly limited, however, the connection can be carried out by heat, for example, welding. In this case, even if the connection method using, for example welding, is employed with the solid electrolytic capacitor of the present invention, it is possible to suppress the deterioration of the production property due to heat by the heat insulation effectiveness by the conductive elastic body.

EXAMPLES

Hereinafter, the present invention will be described in more detail by way of illustrative examples.

Example 1

In Example 1, a solid electrolytic capacitor having the same structure as in FIGS. 1A and B will be produced in the below-mentioned manner.

As an anode, an aluminum foil (soft material) having a purity of 99.98% and a thickness of 100 $\mu$m was prepared and the surface of the aluminum was subjected to alternating-current electrochemical etching in a hydrochloric acid solvent with a concentration of 10% by weight at 30° C., whereby the surface was roughened. Then, the surface of the aluminum film was anodized, whereby a dielectric layer made of aluminum oxide was formed on the surface of the anode. The anodization was carried out using an aqueous solution of ammonium adipate at 60° C. with an anodizing voltage of 13 volts applied.

Then, the anode provided with the dielectric layer was punched out in a predetermined shape, and a resin tape was attached on the boundary between the portion to be an anode lead portion and the rest portion (hereinafter "capacitance formation portion" will be referred to) to separate both portions. At this time, the size of the part to be an anode lead portion (the portion except for the portion to which the resin tape is attached) is set to be 1.0 mm in length×3.2 mm in width; and the size of the capacitance formation portion is set to be 3.5 mm in length×3.2 mm in width (the length of the resin tape in the same direction is 0.5 mm). Thereafter, the end portion of the capacitance formation portion to which the metal aluminum is exposed by punching was subjected to the anodization under the same conditions as mentioned above, whereby the dielectric layer was formed.

Next, on the surface of the dielectric layer of the capacitance formation portion, a manganese dioxide layer is formed as a pre-coat layer by the thermal decomposition of manganese nitrate, then a solid electrolytic layer made of polypyrrole was formed by the electrolytic oxidation polymerization using the pre-coat layer as an anode. Thereafter, a carbon paste layer and a silver paste layer are laminated by coating and drying on the surface of the solid electrolytic layer so as to make a cathode layer. Thus, a capacitor unit with a rating of 6.3 V and capacitance value of 12 $\mu$F was produced.

The twenty capacitor units were produced by the above-mentioned procedures, and laminated onto each other via a silver adhesive so as to form a unit laminate.

The cathodic extraction terminal was connected to the surface of the laminate perpendicular to the direction in which the capacitor units are laminated. Furthermore, the sealing body was formed in a state in which the end portion of the cathodic extraction terminal was exposed to the outside. The formation of the sealing body was carried out by transfer molding of the epoxy resin. Herein, in FIG. 1B, the surface of the anode lead 1a was in direct contact with the sealing body 8. However, in this Example, since the entire surface of the anode 1 was anodized in advance and punched out, the oxide film was formed on the interface between the anode lead and the sealing body (not significantly contribute to the capacitance).

The sealing body was polished until a part of the anode lead was exposed and then the exposed portion of the anode lead was plated. The plating, layer was made to have a two layered structure in which a nickel plating layer and a gold plating layer were laminated in this order from the anode side. The plating layer was formed as follows: first, an oxide film was removed from the surface of the aluminum by washing with a degreasing agent and zinc substitution; and electroless nickel plating was carried out followed by electroless gold plating. For the degreasing, zinc substitution and plating, chemicals produced by Okuno Pharmaceutical Co., Ltd. were used.

Then, the anodic conductive elastic body was formed by coating a thermosetting silver paste containing epoxy resin (product by NAMICS CORPORATION, the same thermosetting silver paste is used in the following Examples) on the surface of the sealing body on which the anode lead portions were exposed. Thus, the anodes were electrically integrated each other. Finally, the cathodic extraction terminal exposed to the outside of the sealing body was folded in a predetermined direction, and thus a solid electrolytic capacitor was obtained.

In this solid electrolytic capacitor, the length of space necessary for an electrically integration of the anode (the length corresponding to L in FIG. 1B) was 1 mm.

Example 2

A solid electrolytic capacitor having the same structure as in FIG. 3A and FIG. 3B was produced by the same method as in Example 1 except that a cathodic extraction terminal was connected to the surface of the laminate parallel to the direction in which the capacitor units were laminated. The cathodic extraction terminal was arranged so that it was connected to the cathode layer of all capacitor units constituting the unit laminate via a silver adhesive.

In the solid electrolytic capacitor, the length of space necessary for an electrical integration of the anode (the length corresponding to L in FIG. 3B) was 1 mm.

Example 3

A solid electrolytic capacitor having the same structure as in FIGS. 6A and 6B was produced in the below-mentioned manner. First, a unit laminate was produced in the same method as in Example 1. A metal chip was connected to the surface of the laminate parallel to the direction in which the capacitor units were laminated via a silver adhesive.

Then, the sealing body was produced by the transfer molding of epoxy resin and the resultant sealing body was polished until a part of the metal chip is exposed. And then, the cathodic conductive elastic body was formed by coating a thermosetting silver paste containing epoxy resin so as to cover the exposed portion of the metal chip and curing thereof. In this solid electrolytic capacitor, the length of space necessary for an electrical integration of the cathode (the length between the end portion of the laminate and the surface of the cathodic conductive elastic body, which corresponds to D in FIG. 6B) was 1 mm.

On the other hand, by the same method as in Example 1, the sealing body was polished until a part of the anode lead was exposed and the exposed portion of the anode lead was plated. Thereafter, an anode conductive elastic body was formed so that the anodes were electrically integrated with each other. Thus, a solid electrolytic capacitor was obtained. Herein, the length of space necessary for an electrically integration of the anode (the length corresponding to L in FIG. 6B) was 1 mm.

Example 4

A solid electrolytic capacitor having the same structure as in FIG. 10A and FIG. 10B was produced by the below-mentioned method. First, twenty capacitor units with a rating of 6.3 V and capacitance value of 12 $\mu$F was produced by the same method as in Example 1 except that a cathode layer was not formed.

On the other hand, on the surface of the aluminum foil (soft material) having a purity of 99.9% and a thickness of 50 $\mu$m, acetylene black having a average particle size of 2 $\mu$m was allowed to be dispersed. The amount of acetylene black was set to be 30 weight % with respect to the aluminum foil. Next, linear pressure of 100 kg/cm was applied to the direction perpendicular to the aluminum foil so as to obtain an aluminum foil in which the acetylene black was filled. Twenty-one of the aluminum foils were produced (hereinafter, "cathode foil" will be referred to).

The unit laminate was formed by laminating the capacitor unit and the cathode foil alternately. A silver adhesive was interposed between the capacitor unit and the cathode foil.

The unit laminate was sealed by a transfer molding method with epoxy resin. This sealing body was polished until a part of the anode lead and the cathode foil were exposed respectively, then the exposed portion of the anode lead and the exposed portion of the cathode foil were plated, respectively. The plating layer was set to have a two-layered structure in which a nickel plating layer and the gold plating layer were laminated. The plating layer was formed by the same method as in Example 1.

Then, the anodic conductive elastic body was formed by coating a thermosetting silver paste containing epoxy resin on the surface of the sealing body on which the anode leads were exposed. Thus, the anodes were electrically integrated each other. Furthermore, the cathodic conductive elastic body was formed by coating a thermosetting silver paste containing epoxy resin on the surface of the sealing body on which the cathode foils were exposed and the cathode foils were electrically integrated with each other. Thus, a solid electrolytic capacitor was obtained.

In this solid electrolytic capacitor, the length of space necessary for an electrical integration of the anode (the length corresponding to L in FIG. 10B) was 1 mm. On the other hand, the length of space necessary for an electrical integration of the cathode (the length corresponding to D in FIG. 10B) was 1 mm.

Comparative Example 1

Figure 13A:
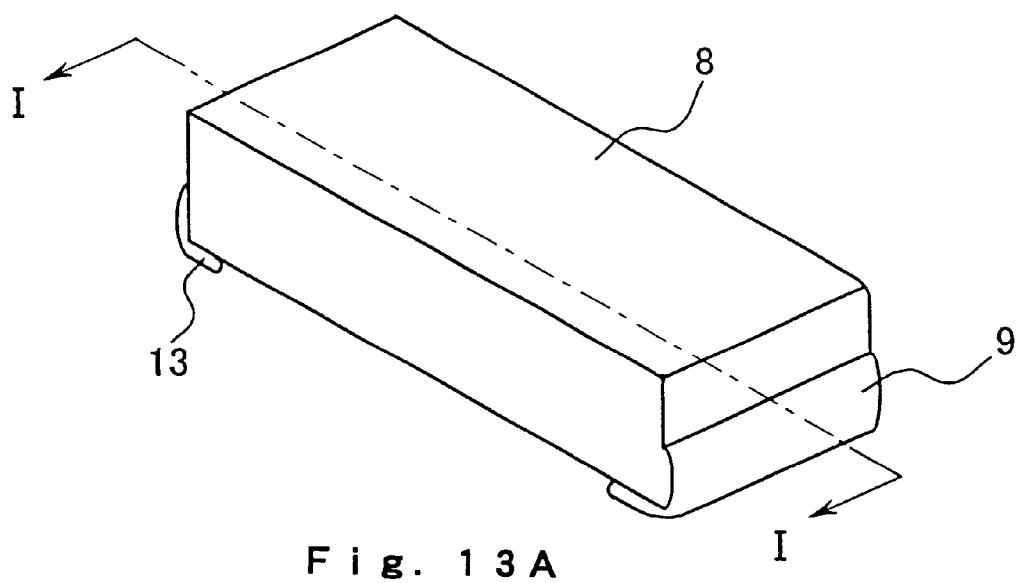
FIG. 13A is a perspective view of a conventional solid electrolytic capacitor.
Figure 13B:
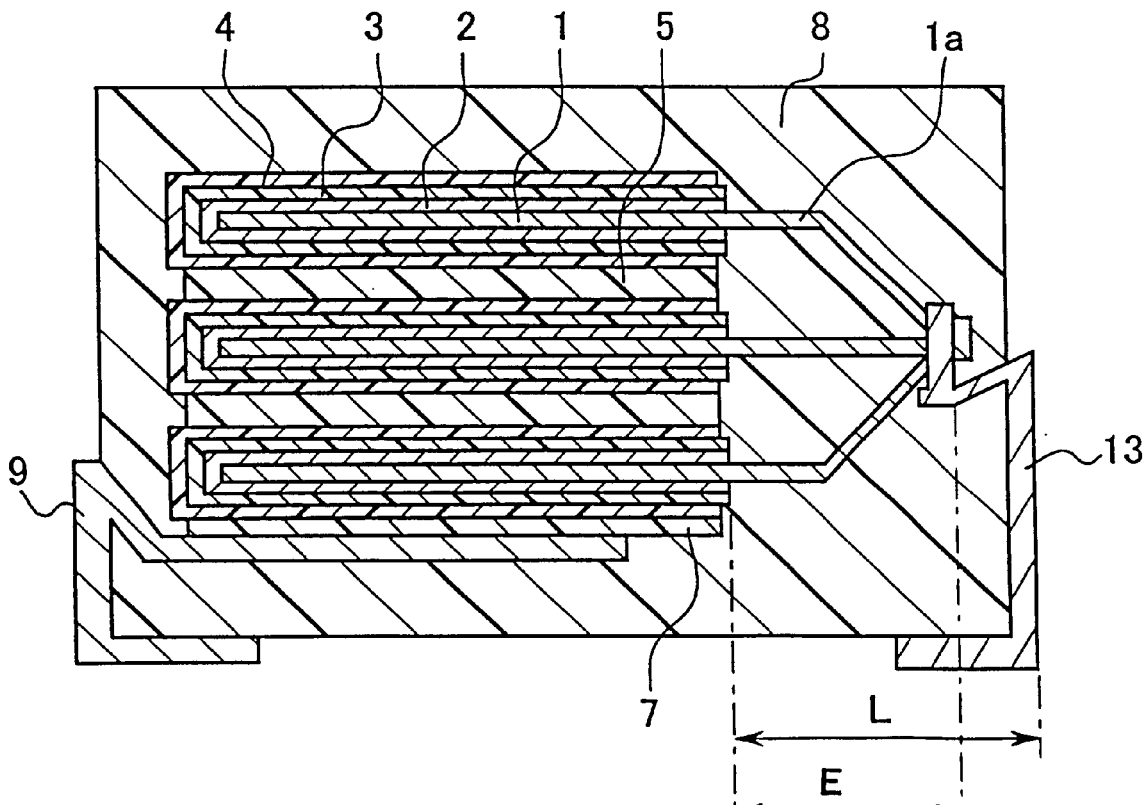
FIG. 13B is a cross-sectional view thereof.

A solid electrolytic capacitor having the same structure as in FIGS. 13A and 13B was prepared by the below-mentioned manner. First, a unit laminate was produced in the same method as in Example 1. A cathodic extraction terminal was connected to the surface of the laminate perpendicular to the direction in which the capacitor units were laminated via a silver adhesive.

Then, the anode leads and the anodic extraction terminal were integrated by laser welding. Herein, the integration was carried out as follows: first, four anode leads were caulked by a metal plate and welded and then these were welded to the anodic extraction terminal.

Furthermore, the sealing body was formed in a state in which the end portions of the anodic extraction terminal and the cathodic extraction terminal were exposed. The formation of the sealing body was carried out by the transfer molding of epoxy resin, and the anodic extraction terminal and the cathodic extraction terminal exposed to the outside of the sealing body were folded in a predetermined direction, and thus a solid electrolytic capacitor was obtained.

In this solid electrolytic capacitor, the length of space necessary for an electrical integration of the anode (the length corresponding to E in FIG. 13B) was 2 mm. When the length included the length for the layout of the anodic extraction terminal, the length (the length corresponding to L in FIG. 13B) was 2.5 mm.

Comparative Example 2

A solid electrolytic capacitor was prepared in the same method as in Example 1 except that a plating layer was not formed between the anode lead and the anodic conductive elastic layer. In this solid electrolytic capacitor, the length of space necessary for an electrical integration of the anode was 1 mm.

Regarding the twenty solid electrolytic capacitors produced in the above-mentioned Examples 1 to 4 and Comparative Examples 1 and 2, the capacitance at 100 Hz and the equivalent series resistance at 100 kHz of each capacitor were measured. The average values of these measurements are shown in Table 1 below.

TABLE 1

|  | Capacitance (100 Hz) [$\mu$F] | Equivalent series resistance (100 kHz) [m$\Omega$] |
| --- | --- | --- |
| Ex. 1 | 250 | 12 |
| Ex. 2 | 245 | 8 |
| Ex. 3 | 245 | 5 |
| Ex. 4 | 245 | 4 |
| Co. Ex. 1 | 240 | 14 |
| Co. Ex. 2 | 150 | 50 |

As shown in Table 1, it was confirmed that the solid electrolytic capacitors in Examples 1 to 4 had the equivalent series resistance that is equal to or less than that of Comparative Example 1 and less than that of Comparative Example 2. Furthermore, it was confirmed that the solid electrolytic capacitors in Examples 1 to 4 had capacitance that is larger than that of Comparative Example 2 and that excellent capacitance could be extracted from all capacitor units.

Furthermore, as mentioned above, it was confirmed that in the solid electrolytic capacitors in Examples 1 to 4, the length of the space necessary for the electric integration of the anode was 1 mm and this value was smaller than 2 mm of Comparative Example 1. Thus miniaturization and large capacitance of the solid electrolytic capacitor could be realized.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A solid electrolytic capacitor comprising:
   a laminate comprising a plurality of capacitor units, each capacitor unit comprising an anode made of a valve metal, a dielectric layer formed on the anode and a solid electrolytic layer formed on the dielectric layer;
   a sealing body for sealing the laminate; and
   an anodic conductive elastic body formed outside the sealing body and electrically connected to the anode;
   the anodes being electrically connected to each other via the anodic conductive elastic body;
   wherein a part of the anode is exposed to the outside of the sealing body, and the exposed portion of the anode is covered with a plating layer and electrically connected to the anodic conductive elastic body via the plating layer.

2. The solid electrolytic capacitor according to claim 1, wherein the capacitor unit further comprises a cathode layer laminated on the solid electrolytic layer.

3. The solid electrolytic capacitor according to claim 1, wherein the plating layer has a multi-layer structure.

4. The solid electrolytic capacitor according to claim 1, wherein the plating layer comprises at least one selected from the group consisting of a nickel plating layer, a copper plating layer, a zinc plating layer, a silver plating layer, a tin plating layer, a gold plating layer and a solder plating layer.

5. The solid electrolytic capacitor according to claim 1, wherein the anodic conductive elastic body is formed of a resin comprising conductive powder.

6. The solid electrolytic capacitor according to claim 5, wherein the conductive powder is at least one selected from the group consisting of silver powder, copper powder, and carbon powder.

7. The solid electrolytic capacitor according to claim 1, further comprising a metal electrode formed outside the sealing body and electrically connected to the anodic conductive elastic body.

8. The solid electrolytic capacitor according to claim 7, wherein the metal electrode is a metal plate or a metal cap.

9. The solid electrolytic capacitor according to claim 8, wherein at least a part of the metal plate or the metal cap that is in contact with the anodic conductive elastic body is plated.

10. The solid electrolytic capacitor according to claim 7, wherein the metal electrode is a metal layer formed by plating.

11. The solid electrolytic capacitor according to claim 1, wherein the capacitor units are laminated to each other via a conductive adhesive and the solid electrolytic layers are electrically connected to each other via this conductive adhesive.

12. The solid electrolytic capacitor according to claim 1, further comprising a cathodic terminal electrically connected to the solid electrolytic layer, the cathodic terminal being adjacent to all the capacitor units constituting the laminate and directly connected to all the capacitor units via a conductive adhesive.

13. The solid electrolytic capacitor according to claim 12, wherein the cathodic terminal is a lead frame and a part of the lead frame is exposed to the outside of the sealing body.

14. The solid electrolytic capacitor according to claim 12, wherein the cathodic terminal is a metal chip and part of the metal chip is exposed to the outside of the sealing body.

15. The solid electrolytic capacitor according to claim 14, wherein the metal chip comprises at least one selected from silver and gold.

16. The solid electrolytic capacitor according to claim 14, wherein a part of the metal chip exposed to the outside of the sealing body is covered with a cathodic conductive elastic body.

17. The solid electrolytic capacitor according to claim 16, wherein the cathodic conductive elastic body is formed of a resin comprising a conductive powder.

18. The solid electrolytic capacitor according to claim 17, wherein the conductive powder is at least one selected from the group consisting of silver powder, copper powder, and carbon powder.

19. The solid electrolytic capacitor according to claim 16, further comprising a metal electrode formed outside the sealing body and electrically connected to the cathoidic conductive elastic body.

20. The solid electrolytic capacitor according to claim 19, wherein the metal electrode is a metal plate or a metal cap.

21. The solid electrolytic capacitor according to claim 20, wherein at least a part of the metal plate or the metal cap that is in contact with the cathodic conductive elastic body is plated.

22. The solid electrolytic capacitor according to claim 19, wherein the metal electrode is a metal layer formed by plating.

23. The solid electrolytic capacitor according to claim 1, wherein the capacitor units are laminated to each other via a metal foil and the solid electrolytic layers are electrically connected to each other via this metal foil.

24. The solid electrolytic capacitor according to claim 23, wherein the metal foil is made of a valve metal.

25. The solid electrolytic capacitor according to claim 24, further comprising a cathodic conductive elastic body formed outside the sealing body and electrically connected to the metal foil, wherein a part of the metal foil is exposed to the outside of the sealing body and the exposed portion is covered with the plating layer and electrically connected to the cathodic conductive elastic body via the plating layer.

26. The solid electrolytic capacitor according to claim 25, wherein the cathodic conductive elastic body is formed of a resin comprising conductive powder.

27. The solid electrolytic capacitor according to claim 26, wherein the conductive powder is at least one selected from the group consisting of silver powder, copper powder, and carbon powder.

28. The solid electrolytic capacitor according to claim 25, further comprising a metal electrode formed outside the sealing body and electrically connected to the cathodic conductive elastic body.

29. The solid electrolytic capacitor according to claim 28, wherein the metal electrode is a metal plate or a metal cap.

30. The solid electrolytic capacitor according to claim 29, wherein at least a part of the metal plate or the metal cap that is in contact with the cathodic conductive elastic body is plated.

31. The solid electrolytic capacitor according to claim 29, wherein the metal electrode is a metal layer formed by plating.

32. A solid electrolytic capacitor comprising:
   a laminate comprising a plurality of capacitor units, each capacitor unit comprising an anode made of a valve metal, a dielectric layer formed on the anode, a solid electrolytic layer formed on the dielectric layer and a cathode layer formed on the solid electrolytic layer;
   a sealing body for sealing the laminate; and an anodic conductive elastic body formed outside the sealing body and electrically connected to the anode;

the anodes being electrically connected to each other via the anodic conductive elastic body;

wherein a part of the anode is exposed to the outside of the sealing body, and the exposed portion of the anode is covered with a plating layer and electrically connected to the anodic conductive elastic body via the plating layer.

33. The solid electrolytic capacitor according to claim 32, wherein the plating layer has a multi-layer structure.

34. The solid electrolytic capacitor according to claim 32, wherein the plating layer comprises at least one plating layer selected from the group consisting of a nickel plating layer, a copper plating layer, a zinc plating layer, a silver plating layer, a tin plating layer, a gold plating layer and a solder plating layer.

35. The solid electrolytic capacitor according to claim 32, wherein the anodic conductive elastic body is formed of a resin comprising conductive powder.

36. The solid electrolytic capacitor according to claim 35, wherein the conductive powder is at least one selected from the group consisting of silver powder, copper powder, and carbon powder.

37. The solid electrolytic capacitor according to claim 32, further comprising a metal electrode formed outside the sealing body and electrically connected to the anodic conductive elastic body.

38. The solid electrolytic capacitor according to claim 37, wherein the metal electrode is a metal plate or a metal cap.

39. The solid electrolytic capacitor according to claim 38, wherein at least a part of the metal plate or the metal cap that is in contact with the anodic conductive elastic body is plated.

40. The solid electrolytic capacitor according to claim 37, wherein the metal electrode is a metal layer formed by plating.

41. The solid electrolytic capacitor according to claim 32, wherein the capacitor units are laminated to each other via a conductive adhesive and the cathode layers are electrically connected to each other with this conductive adhesive.

42. The solid electrolytic capacitor according to claim 32, further comprising a cathodic terminal electrically connected to the cathode layer, the cathodic terminal being adjacent to all the capacitor units constituting the laminate and directly connected to all the capacitor units via a conductive adhesive.

43. The solid electrolytic capacitor according to claim 42, wherein the cathodic terminal is a lead frame and a part of the lead frame is exposed to the outside of the sealing body.

44. The solid electrolytic capacitor according to claim 42, wherein the cathodic terminal is a metal chip and a part of the metal chip is exposed to the outside of the sealing body.

45. The solid electrolytic capacitor according to claim 44, wherein the metal chip comprises at least one selected from silver and gold.

46. The solid electrolytic capacitor according to claim 44, wherein a part of the metal chip exposed to the outside of the sealing body is covered with a cathodic conductive elastic body.

47. The solid electrolytic capacitor according to claim 46, wherein the cathodic conductive elastic body is formed of a resin comprising a conductive powder.

48. The solid electrolytic capacitor according to claim 47, wherein the conductive powder is at least one selected from the group consisting of silver powder, copper powder, and carbon powder.

49. The solid electrolytic capacitor according to claim 46, further comprising a metal electrode formed outside the sealing body and electrically connected to the cathodic conductive elastic body.

50. The solid electrolytic capacitor according to claim 49, wherein the metal electrode is a metal plate or a metal cap.

51. The solid electrolytic capacitor according to claim 50, wherein at least a part of the metal plate or the metal cap that is in contact with the cathodic conductive elastic body is plated.

52. The solid electrolytic capacitor according to claim 49, wherein the metal electrode is a metal layer formed by plating.

53. The solid electrolytic capacitor according to claim 32, wherein the capacitor units are laminated with each other via a metal foil and the cathode layers are electrically connected with each other with this metal foil.

54. The solid electrolytic capacitor according to claim 53, wherein the metal foil is made of a valve metal.

55. The solid electrolytic capacitor according to claim 54, further comprising a cathodic conductive elastic body formed outside the sealing body and electrically connected to the metal foil, wherein a part of the metal foil is exposed to the outside of the sealing body and the exposed portion is covered with the plating layer and electrically connected to the cathodic conductive elastic body via the plating layer.

56. The solid electrolytic capacitor according to claim 55, wherein the cathodic conductive elastic body is formed of a resin comprising conductive powder.

57. The solid electrolytic capacitor according to claim 56, wherein the conductive powder is at least one selected from the group consisting of silver powder, copper powder, and carbon powder.

58. The solid electrolytic capacitor according to claim 55, further comprising a metal electrode formed outside the sealing body and electrically connected to the cathodic conductive elastic body.

59. The solid electrolytic capacitor according to claim 58, wherein the metal electrode is a metal plate or a metal cap.

60. The solid electrolytic capacitor according to claim 59, wherein at least a part of the metal plate or the metal cap that is in contact with the cathodic conductive elastic body is plated.

61. The solid electrolytic capacitor according to claim 59, wherein the metal electrode is a metal layer formed by plating.

* * * * *